United States Patent
Choi et al.

(10) Patent No.: US 11,797,126 B2
(45) Date of Patent: Oct. 24, 2023

(54) DISPLAY DEVICE AND METHOD OF DRIVING THE DISPLAY DEVICE

(71) Applicant: SAMSUNG DISPLAY CO., LTD., Yongin-si (KR)

(72) Inventors: Jaeuk Choi, Seoul (KR); Yun-Ho Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/814,976

(22) Filed: Jul. 26, 2022

(65) Prior Publication Data

US 2023/0143141 A1 May 11, 2023

(30) Foreign Application Priority Data

Nov. 8, 2021 (KR) .......................... 10-2021-0152284

(51) Int. Cl.
*G06F 3/041* (2006.01)
*G06F 3/046* (2006.01)
*G06F 3/044* (2006.01)

(52) U.S. Cl.
CPC ............ *G06F 3/0418* (2013.01); *G06F 3/046* (2013.01); *G06F 3/04162* (2019.05); *G06F 3/0443* (2019.05)

(58) Field of Classification Search
CPC .... G06F 3/0418; G06F 3/04162; G06F 3/046; G06F 3/0443
See application file for complete search history.

(56) References Cited

U.S. PATENT DOCUMENTS 4,878,553 A 11/1989 Yamanami et al.
2019/0064944 A1* 2/2019 Kobori .................. G06F 3/0416

FOREIGN PATENT DOCUMENTS

KR    10-2118927    6/2020
KR    10-2210216    2/2021

* cited by examiner

*Primary Examiner* — Lisa S Landis
(74) *Attorney, Agent, or Firm* — F. CHAU & ASSOCIATES, LLC

(57) ABSTRACT

A display device includes a display panel displaying an image, an input sensing layer disposed on the display panel that resonates with an electromagnetic signal provided from an external input device in a first frame to generate a first sensing signal, and a sensing controller including a calculation unit calculating input information of the external input device based on the first sensing signal. The input sensing layer includes a first sensing area, a non-sensing area, and a second sensing area defined between the non-sensing area and the first sensing area, the sensing controller includes a correction unit correcting an edge signal to generate a correction edge signal when the first sensing signal is the edge signal generated in the second sensing area, and the calculation unit calculates edge input information provided to the second sensing area as input information based on the correction edge signal.

19 Claims, 16 Drawing Sheets

DISPLAY DEVICE AND METHOD OF DRIVING THE DISPLAY DEVICE

CROSS-REFERENCE TO RELATED APPLICATIONS

This U.S. non-provisional patent application claims priority under 35 U.S.C. § 119 to Korean Patent Application No. 10-2021-0152284, filed on Nov. 8, 2021, in the Korean Intellectual Property Office, the disclosure of which is incorporated by reference herein in its entirety.

TECHNICAL FIELD

Embodiments of the inventive concept relate generally to display devices, and more particularly to a method for driving a display device to maintain reliable sensing of external inputs sensed by the display device.

DISCUSSION OF THE RELATED ART

Multimedia electronic devices, such as televisions, mobile phones, tablet computers, navigation units, and game units, include a display device to display images. The display device may include an input sensing layer that provides a touch activated input allowing users to easily and intuitively input information or commands in addition to more conventional and well-known input methods, such as, for example, keyboards, mice, trackballs, joysticks, game controllers, graphic tablets and the like.

In the case of a display device that incorporates a touch screen based on touch activated inputs, the input sensing layer senses a touch or pressure generated by a part of a user's body and/or senses a touch or a pressure generated by a touch-sensitive pen, which provides a precise touch input for users who are familiar with inputting information using a writing instrument or for specific application programs (e.g., for sketching or drawing application programs).

SUMMARY

An embodiment of the inventive concept provides a display device and associated method for operating the display device to maintain reliable sensing of external inputs sensed by the display device regardless of a position of an external input provided to the display device. More particularly, in the case where a sensing signal used to sense external inputs to the display device is distorted, the distorted sensing signal is corrected before the external input is sensed, thus maintaining the reliability of the input information of the external input.

According to an embodiment of the inventive concept, a display device includes a display panel for displaying an image, and an input sensing layer disposed on the display panel that resonates with an externally applied electromagnetic signal provided from an external input device in a first frame to generate a first sensing signal. The display device further includes a sensing controller including a calculation unit for calculating input information of the external input device based on the first sensing signal. The input sensing layer includes a first sensing area, a non-sensing area, and a second sensing area arranged between the non-sensing area and the first sensing area. The sensing controller further includes a correction unit for correcting an edge signal to generate a correction edge signal when the first sensing signal is determined to be an edge signal generated in the second sensing area of the input sensing layer. In the case where the first sensing signal is determined to be an edge signal in the second sensing area, the calculation unit calculates edge input information as input information about the edge signal provided to the second sensing area based on the correction edge signal.

The sensing controller further includes an area determination unit that receives the first sensing signal from the input sensing layer and compares the first sensing signal with a predetermined reference value to determine whether the first sensing signal is a center signal corresponding to the first sensing area or an edge signal corresponding to the second sensing area.

The calculation unit calculates center input information that is provided to the first sensing area when the sensing controller determines that the first sensing signal is a center signal corresponding to the first sensing area.

The sensing controller further includes a direction determination unit for determining a movement direction of the external input device. More particularly, when the first sensing signal is determined to be an edge signal, the direction determination unit is configured to determine a movement direction of the external input device during a second frame right before the first frame and the first frame using the edge signal received from the area determination unit and a second sensing signal generated in the second frame.

The sensing controller further includes a correction value setting unit for setting a correction value. The direction determination unit provides the edge signal to the correction value setting unit when the movement direction of the external input device AP is identified as a first reference direction, defined as a direction toward the second sensing area away from the first sensing area.

The correction value setting unit sets the correction value based on the edge signal generated in the second sensing area, the second sensing signal generated in the second frame right before the first frame, and a third sensing signal generated in a third frame right before the second frame. When a first center of gravity of the edge signal is greater than a second center of gravity of the second sensing signal, and a third center of gravity of the third sensing signal is greater than the second center of gravity, the correction value setting unit sets the second center of gravity as the correction value.

The sensing controller further includes a correction unit that corrects the edge signal based on the correction value to generate the correction edge signal.

When a difference between the correction value and the first center of gravity is defined as a correction difference, the correction unit corrects the edge signal based on the correction difference, to generate the correction edge signal.

The sensing controller further includes a first comparison unit for comparing the edge signal with the correction value, and the correction unit generates the correction edge signal when it is determined that the edge signal is greater than the correction value according to the compared result.

The calculation unit calculates the edge input information based on the correction edge signal when the edge signal is greater than the correction value.

The calculation unit calculates the edge input information based on the edge signal when the edge signal is equal to or less than the correction value.

The sensing controller further includes a correction value memory unit for storing the correction value.

The sensing controller further includes a correction value setting unit for setting a correction value and a second comparison unit for comparing the edge signal with the correction value, and the direction determination unit provides the edge signal to the second comparison unit when the movement direction of the external input device is a second reference direction toward the first sensing area from the second sensing area.

The calculation unit calculates the edge input information based on the edge signal when the edge signal is equal to the correction value.

The second comparison unit provides the edge signal to the correction value setting unit when the edge signal is different from the correction value.

The sensing controller further includes a correction unit correcting the edge signal based on the correction value to generate the correction edge signal, and the calculation unit calculates the edge input information based on the correction edge signal.

The sensing controller further includes a memory unit storing a plurality of sensing signals each being generated by the electromagnetic signal provided from the external input device in every frame.

Embodiments of the inventive concept provide a method of driving a display device including a display panel displaying an image, an input sensing layer disposed on the display panel that resonates with an electromagnetic signal provided from an external input device in a first frame to generate a first sensing signal, and a sensing controller for calculating input information of the external input device based on the first sensing signal. The method includes determining whether the first sensing signal is a center signal generated in a first sensing area of the input sensing layer or an edge signal generated in a second sensing area disposed between the first sensing area and a non-sensing area of the input sensing layer, determining a movement direction of the external input device during a first frame and a second frame using the edge signal and a second sensing signal generated in the second frame right before the first frame, setting a correction value based on the edge signal, the second sensing signal, and a third sensing signal generated in a third frame right before the second frame when the determined movement direction of the external input device is a first reference direction toward the second sensing area from the first sensing area, and correcting the edge signal based on the correction value to generate a correction edge signal. Edge input information provided to the second sensing area among the input information is calculated based on the correction edge signal.

The method further includes comparing the edge signal with the correction value when the movement direction of the external input device is determined to be a second reference direction toward the first sensing area from the second sensing area and correcting the edge signal based on the correction value to generate the correction edge signal when the edge signal is different from the correction value.

According to the above, a reliable sensing with respect to the input information of an external input sensed by the display device is maintained regardless of a position of the external input provided to the display device. Further, even in the case where the sensing signal used to sense the external input provided to the display device is distorted, the distorted sensing signal is corrected before the external input is sensed by the display device, and thus, reliability is maintained with respect to the input information of the external input sensed by the display device.

BRIEF DESCRIPTION OF THE DRAWINGS

The above and other features of the inventive concept will become more clearly understood from the following detailed description taken in conjunction with the accompanying drawings, in which.

DETAILED DESCRIPTION OF THE EMBODIMENTS

Figure 1:
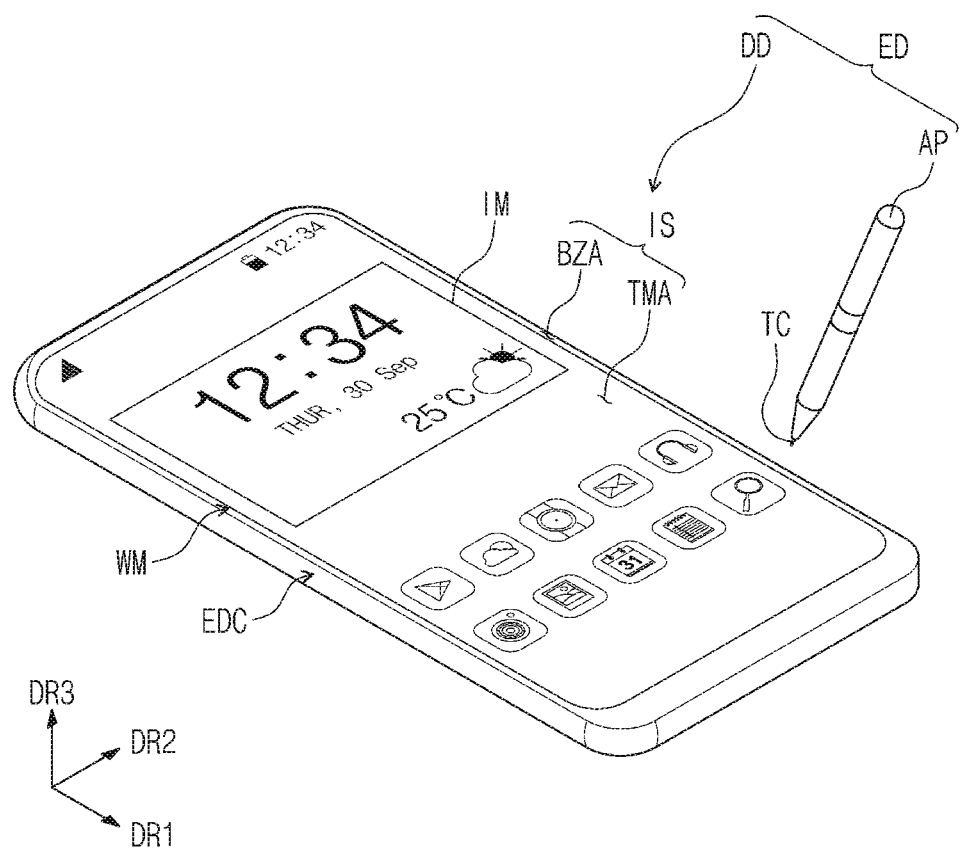
FIG. 1 is a perspective view of an electronic device, according to an embodiment.

Exemplary embodiments of the present inventive concept will be described more fully hereinafter with reference to the accompanying drawings. Like reference numerals may refer to like elements throughout the accompanying drawings.

It will be understood that when a component, such as a film, a region, a layer, or an element, is referred to as being "on", "connected to", "coupled to", or "adjacent to" another component or element, it can be directly on, connected, coupled, or adjacent to the other component or element, or intervening components may be present. It will also be understood that when a component is referred to as being "between" two components or elements, it can be the only component between the two components, or one or more intervening components may also be present. It will also be understood that when a component is referred to as "covering" another component, it can be the only component covering the other component or element, or one or more intervening components may also be covering the other component. Other words use to describe the relationship between elements should be interpreted in a like fashion Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, and the like, may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Herein, when one value is described as being about equal to another value or being substantially the same as or equal to another value, it is to be understood that the values are equal to each other to within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art.

Hereinafter, the present disclosure will be explained in detail with reference to the accompanying drawings.

Figure 2:
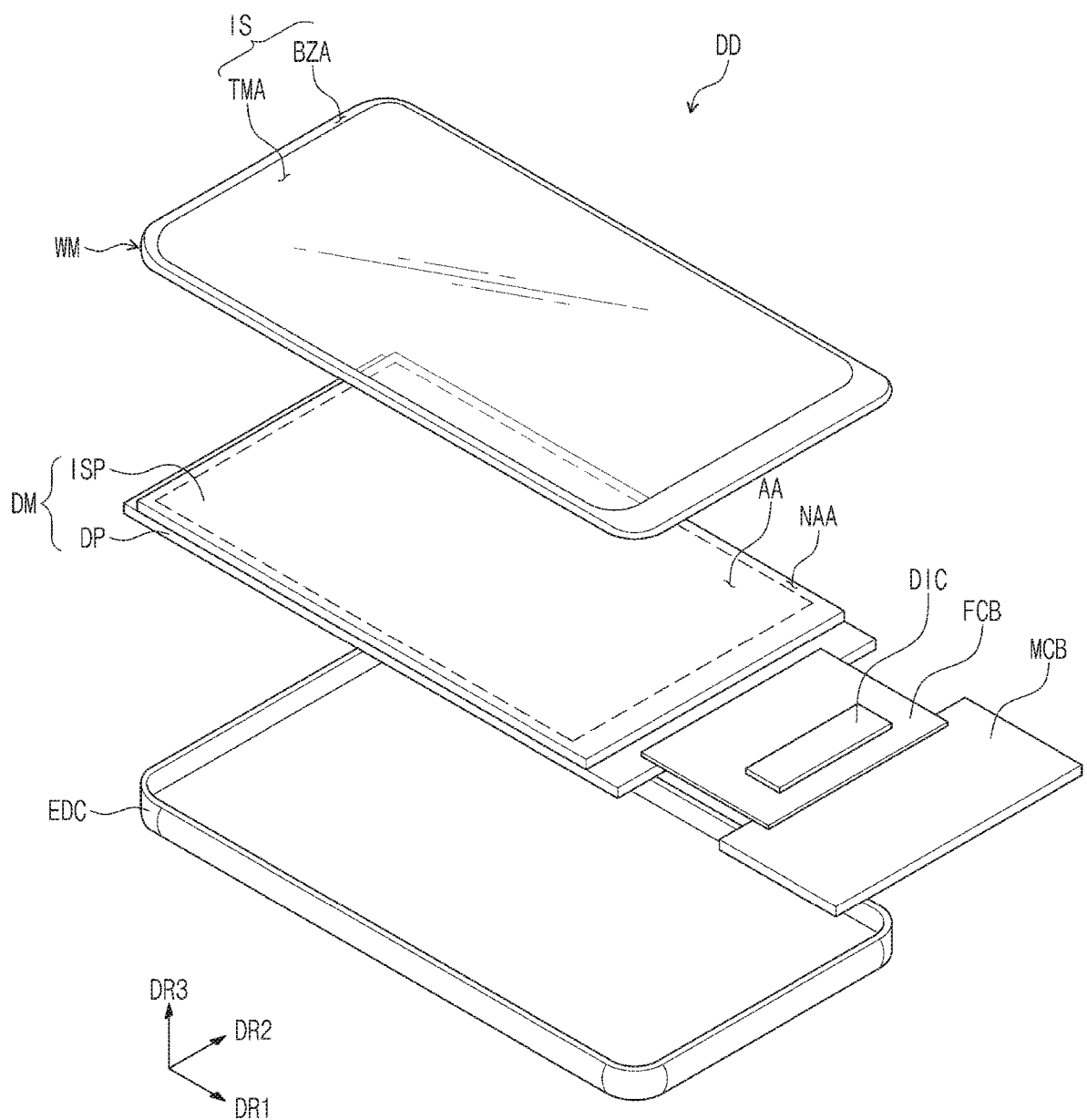
FIG. 2 is an exploded perspective view of the display device of FIG. 1, according to an embodiment.
Figure 6:
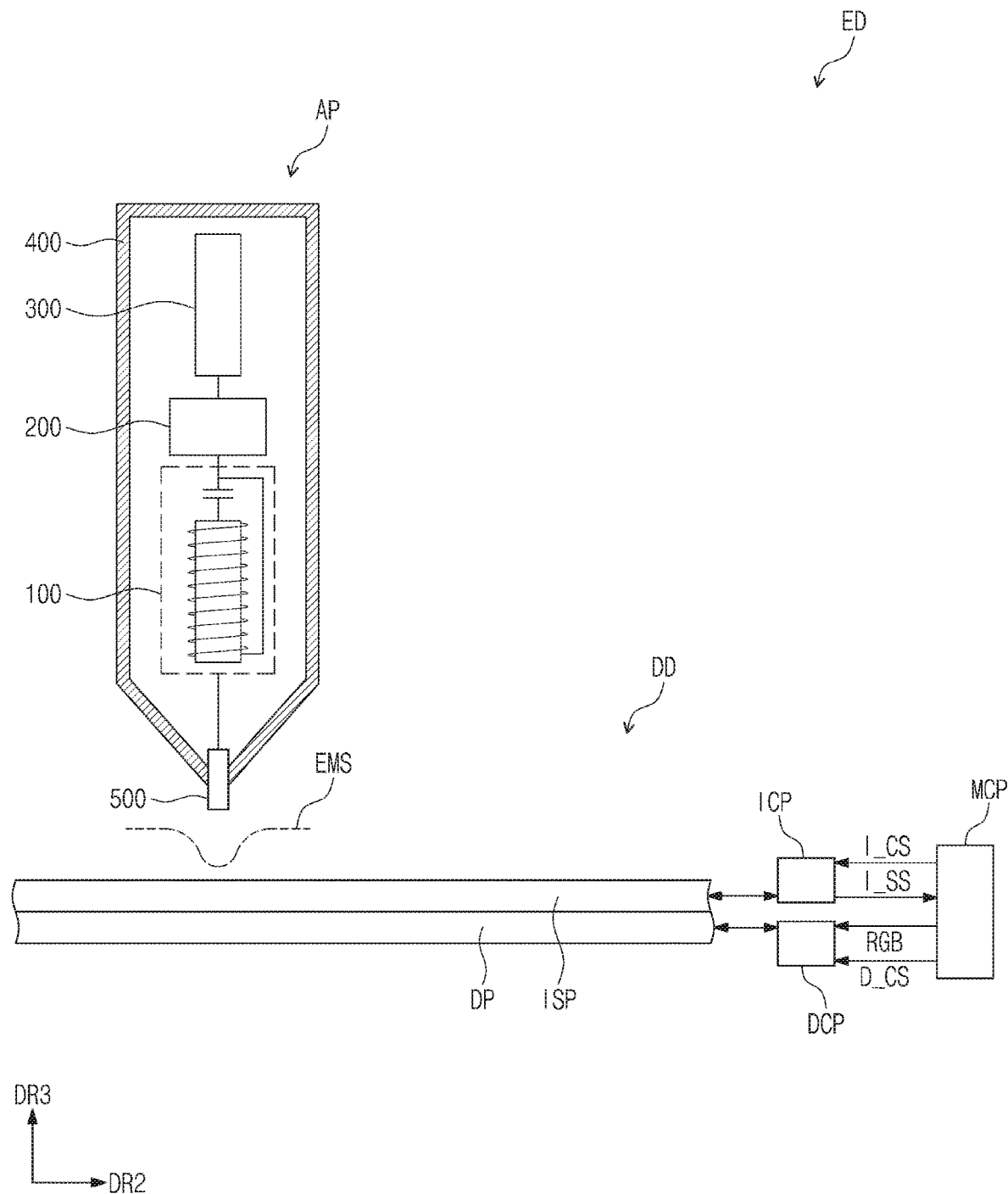
FIG. 6 is a block diagram of an electronic device, according to an embodiment.

FIG. 1 is a perspective view of an electronic device ED according to an embodiment. FIG. 2 is an exploded perspective view of a display device DD for use with the electronic device ED of FIG. 1 The electronic device ED includes the display device DD and an external input device AP, as shown in FIG. 6. The display device DD is a device activated in response to sensed electrical signals. FIG. 1 shows a smartphone as a representative example of the display device DD, however, embodiments of the inventive concept are not limited thereto. In general, the display device DD may be embodied as a large-sized display device, such as, for example, a television set or a monitor as well as a small or medium-sized display device, such as, a mobile phone, a tablet computer, a car navigation unit, or a game unit. It is understood that other embodiments of the display device DD not explicitly described herein are within contemplation for use as long as they do not depart from the inventive concept.

In the present embodiment, the display device DD has a rectangular shape with rounded vertices, which is defined by long sides extending in a first direction DR1 and short sides extending in a second direction DR2 crossing the first direction DR1. However, the shape of the display device DD should not be limited thereto. The display device DD displays an image IM toward a third direction DR3 through a display surface IS that is substantially parallel to each of the first direction DR1 and the second direction DR2. The display surface IS through which the image IM is displayed corresponds to a front surface of the display device DD.

In the present embodiment, front (e.g., upper) and rear (e.g., lower) surfaces of each member of the display device DD are defined with respect to a direction in which the image IM is displayed. The front and rear surfaces are opposite to each other in the third direction DR3. A normal line direction with respect to each of the front and rear surfaces is a direction that is substantially parallel to the third direction DR3.

A separation distance in the third direction DR3 between the front surface and the rear surface corresponds to a thickness of the display device DD.

The first, second, and third directions DR1, DR2, and DR3 are defined herein in relative terms and are changeable.

In operation, the display device DD senses two types of inputs, a first input (non-device input) and second input TC (device input). Each input is an externally applied input, applied from an outside source. For example, the display device DD senses a first input of a user. The first input of the user may be, for example, a body part of the user, light, heat, and pressure, and the like, and combinations thereof. As a further example, the first input may be a touch-based input (e.g., a hand or finger of the user).

The display device DD may also sense a second input TC applied to the display device DD from an external source. The second input TC may include a variety of device-oriented inputs generated by the external input device AP, such as, for example, a stylus pen, an active pen, a touch pen, an electronic pen, or the like. Configurations and operations of the external input device AP will be further described in greater detail below with reference to FIG. 6.

Referring to FIGS. 1 and 2, the front surface of the display device DD includes a transmission area TMA and a bezel area BZA. The transmission area TMA is an area through which the image IM is displayed. The user views the image IM through the transmission area TMA. In the present embodiment, the transmission area TMA has a quadrangular shape with rounded vertices However, the transmission area TMA may have a variety of shapes and should not be particularly limited thereto.

The bezel area BZA is defined adjacent to the transmission area TMA. The bezel area BZA has a predetermined color and surrounds the transmission area TMA. Accordingly, the transmission area TMA has a shape defined by the bezel area BZA, however, the shape of the transmission area TMA is not constrained by the shape of the bezel area BZA. According to an embodiment, the bezel area BZA is disposed adjacent to only one side of the transmission area TMA. In another embodiment, the bezel area BZA is omitted altogether. The display device DD should not be limited to a single embodiment, such as those described above.

Referring again to FIGS. 1 and 2, the display device DD includes a display module DM and a window WM disposed on the display module DM. The display module DM includes a display panel DP that displays the image in response to electrical signals and an input sensing layer ISP that transmits/receives information to and from the first input and the second input TC.

The display panel DP may be a light-emitting type display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot or a quantum rod. Hereinafter, the organic light emitting display panel will be described as a non-limiting representative example of the display panel DP. The display panel DP may output the image IM, and the output image IM is displayed through the display surface IS.

The input sensing layer ISP is disposed on the display panel DP and senses the first input and the second input TC. The configuration and operation of the input sensing layer ISP will be described more fully below with reference to FIGS. 4 and 5.

The window WM may include a transparent material that transmits the image IM. As an example, the window WM may include a glass, sapphire, or plastic material. The window WM may have a single-layer structure, and may include a plurality of layers, however, it should not be limited thereto.

Although not shown in figures, the bezel area BZA of the display device DD may be embodied as a printed material having a predetermined color in an area of the window WM. As an example, the window WM may include a light blocking pattern to define the bezel area BZA. The light blocking pattern may be a colored organic layer and may be formed by a coating method.

In an embodiment, the window WM may be coupled with the display module DM by an adhesive film. As an example, the adhesive film may include an optically clear adhesive film (OCA). However, the adhesive film should not be limited thereto. The adhesive film may include an ordinary adhesive. For example, the adhesive film may include an optically clear resin (OCR) or a pressure sensitive adhesive film (PSA).

An anti-reflective layer may be further disposed between the window WM and the display module DM. The anti-reflective layer may reduce a reflectance with respect to an external light incident thereto from above of the window WM. According to an embodiment, the anti-reflective layer may include a retarder and a polarizer. The retarder may be a film type or liquid crystal coating type and may include a λ/2 retarder and/or a λ/4 retarder. The polarizer may be a film type or liquid crystal coating type. The film type polarizer and retarder may include a stretching type synthetic resin film, and the liquid crystal coating type polarizer and retarder may include liquid crystals aligned in a predetermined alignment. The retarder and the polarizer may be implemented as one polarizing film.

As an example, the anti-reflective layer may include color filters. Arrangements of the color filters may be determined by accounting for the different colors of lights generated by a plurality of pixels included in the display panel DP. The anti-reflective layer may further include a light blocking pattern.

The display module DM displays the image in response to electrical signals from an external input and transmits and receives information regarding the external input. The display module DM includes an effective area AA and a non-effective area NAA. The effective area AA is defined, in one aspect, as an area from which the image IM provided from the display panel DP exits. In addition, the effective area AA may be further defined, in another aspect, as an area in which the input sensing layer ISP senses the first input and the second input TC provided from an external source, however, it should not be limited thereto. According to an embodiment, the area from which the image IM provided from the display panel DP exits is different from the area in which the input sensing layer ISP senses the first input and the second input TC provided from the external source.

The non-effective area NAA is defined as an area adjacent to the effective area AA. As an example, the non-effective area NAA surrounds the effective area AA, however, it should not be limited thereto. According to an embodiment, the non-effective area NAA may have a variety of shapes and should not be particularly limited. According to an embodiment, the effective area AA of the display module DM corresponds to at least a portion of the transmission area TMA.

The display module DM further includes a main circuit board MCB, a flexible circuit film FCB, and a driving chip DIC. The main circuit board MCB is connected to the flexible circuit film FCB and is electrically connected to the display panel DP. The flexible circuit film FCB is connected to the display panel DP and is electrically connect the display panel DP to the main circuit board MCB.

The main circuit board MCB includes a plurality of driving elements. The driving elements include a circuit to drive the display panel DP. The driving chip DIC is be mounted on the flexible circuit film FCB. In the present embodiment, one flexible circuit film FCB is shown as a representative example, however, it should not be limited thereto. According to an embodiment, multiple flexible circuit films FCBs may be connected to the display panel DP.

FIG. 2 shows a structure in which the driving chip DIC is mounted on the flexible circuit film FCB, according to an embodiment. For example, the driving chip DIC may be disposed directly on the display panel DP. In this case, a portion of the display panel DP on which the driving chip DIC is mounted is bent to be disposed on a rear surface of the display module DM. In addition, the driving chip DIC is disposed directly on the main circuit board MCB.

In an embodiment, the input sensing layer ISP may be electrically connected to the main circuit board MCB via the flexible circuit film FCB. Accordingly, in this case, the display module DM would further include a separate flexible circuit film to electrically connect the input sensing layer ISP to the main circuit board MCB.

The display device DD may further include an external case EDC accommodating the display module DM. The external case EDC is coupled with the window WM to define an appearance of the display device DD. The external case EDC absorbs impacts applied thereto from the outside and prevents foreign substance and moisture from entering the display module DM to protect components accommodated in the external case EDC. As an example, the external case EDC may be configured in a form in which a plurality of case members is combined with each other.

According to an embodiment, the display device DD may further include an electronic module including various functional modules to operate the display module DM, a power supply module supplying a power required for an overall operation of the display device DD, and a bracket coupled to the external case EDC to divide an inner space of the display device DD.

Figure 3:
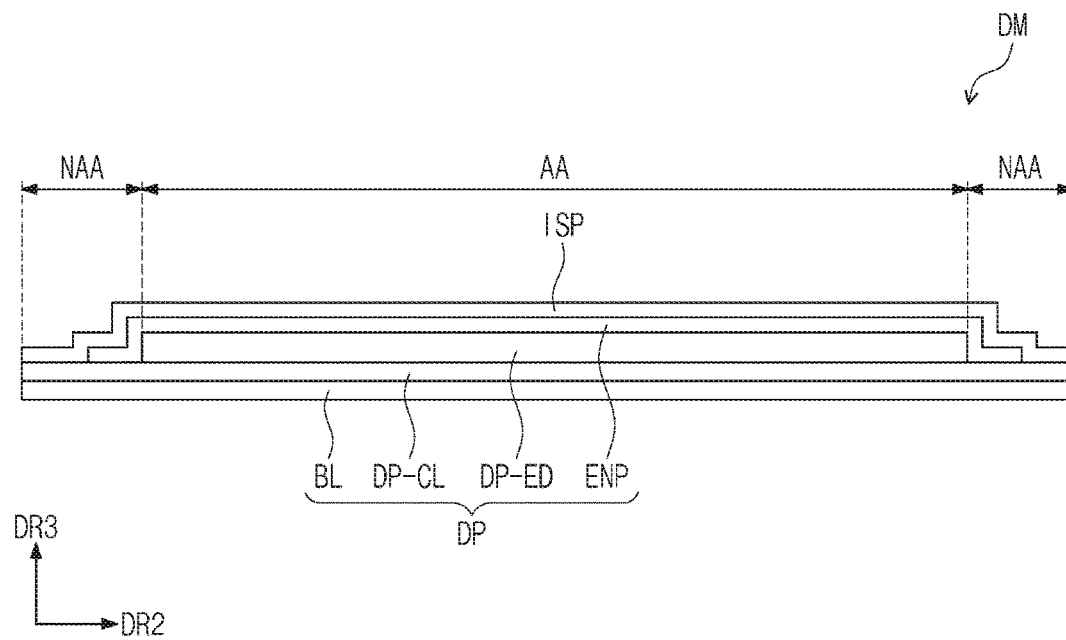
FIG. 3 is a cross-sectional view showing a display module, according to an embodiment.

FIG. 3 is a cross-sectional view showing the display module DM according to an embodiment of the inventive concept.

Referring to FIG. 3, the display module DM includes the display panel DP and the input sensing layer ISP. The display panel DP includes a base layer BL, a circuit element layer DP-CL, a display element layer DP-ED, and an encapsulation layer ENP. The circuit element layer DP-CL, the display element layer DP-ED, and the encapsulation layer ENP are disposed on the base layer BL. Although not shown in the figures, the display panel DP may further include functional layers, such as an anti-reflective layer, a refractive index adjustment layer, as well as other functional layers.

The base layer BL includes at least one synthetic resin layer and a glass material layer, a metal material layer, or an organic/inorganic composite material layer in addition to the synthetic resin layer. As an example, the base layer BL is a flexible layer. The effective area AA and the non-effective area NAA described with reference to FIG. 2 may be applied to the base layer BL in the same way.

The circuit element layer DP-CL is disposed on the base layer BL. The circuit element layer DP-CL includes at least one intermediate insulating layer and a circuit element. The intermediate insulating layer may include at least one intermediate inorganic layer and at least one intermediate organic layer. The circuit element includes signal lines and a pixel driving circuit.

The display element layer DP-ED is disposed on the circuit element layer DP-CL. The display element layer DP-ED includes a plurality of light emitting elements. The light emitting elements may include organic light emitting diodes. The display element layer DP-ED may further include an organic layer such as a pixel definition layer.

The encapsulation layer ENP encapsulates the display element layer DP-ED. The encapsulation layer ENP includes at least one inorganic layer. The encapsulation layer ENP may further include at least one organic layer. The inorganic layer protects the display element layer DP-ED from moisture and oxygen, and the organic layer protects the display element layer DP-ED from a foreign substance such as dust particles. The inorganic layer may include a silicon nitride layer, a silicon oxynitride layer, a silicon oxide layer, a titanium oxide layer, or an aluminum oxide layer. The organic layer may include an acrylic-based organic layer, however, it should not be limited thereto.

The input sensing layer ISP is formed on the display panel DP through successive processes. According to an embodiment, an adhesive film is disposed between the input sensing layer ISP and the display panel DP. The input sensing layer ISP has a multi-layer structure. The input sensing layer ISP has a single-layer structure of an insulating layer or a multi-layer structure of insulating layers. According to an embodiment, in the case where the input sensing layer ISP is disposed directly on the display panel DP through the successive processes, the input sensing layer ISP is disposed directly on the encapsulation layer ENP, and an adhesive film is not disposed between the input sensing layer ISP and the display panel DP. However, according to an embodiment, the adhesive film may be disposed between the input sensing layer ISP and the display panel DP. In this case, the input sensing layer ISP is not manufactured through successive processes with the display panel DP, and the input sensing layer ISP is fixed to an upper surface of the display panel DP by the adhesive film after being manufactured through a separate process.

According to an embodiment, the display panel DP further includes an encapsulation substrate. The encapsulation substrate may be disposed on the display element layer DP-ED to face the base layer BL. The encapsulation substrate includes a plastic substrate, a glass substrate, a metal substrate, or an organic/inorganic composite material substrate. A sealant is disposed between the encapsulation substrate and the base layer BL, and the encapsulation substrate and the base layer BL may be coupled with each other by the sealant. The sealant includes an organic adhesive or a frit that is a ceramic adhesive material. The display element layer DP-ED may be encapsulated by the sealant and the encapsulation substrate.

In the case where the input sensing layer ISP is disposed directly on the display panel DP through successive processes, the input sensing layer ISP is disposed directly on the encapsulation substrate. However, according to an embodiment, in the case where the adhesive film is disposed between the input sensing layer ISP and the display panel DP, the input sensing layer ISP is fixed to an upper surface of the encapsulation substrate by the adhesive film.

Figure 4:
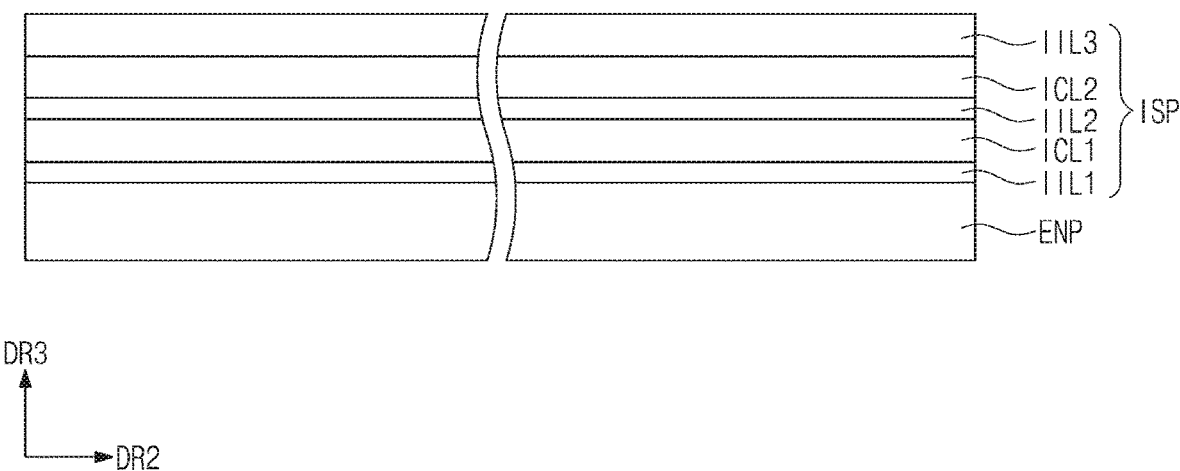
FIG. 4 is a cross-sectional view of an input sensing layer, according to an embodiment.
Figure 5:
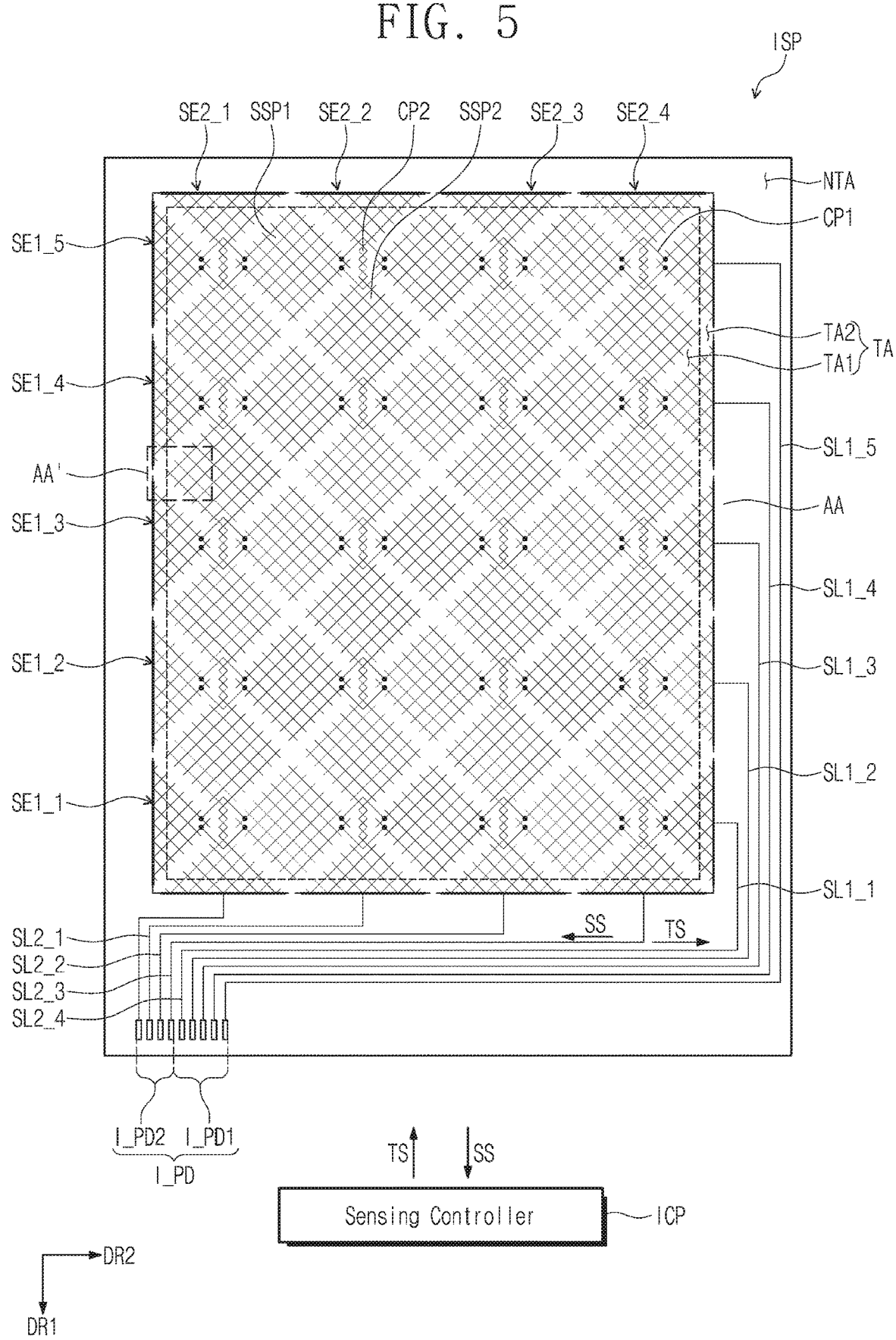
FIG. 5 is a plan view of an input sensing layer and a sensing controller, according to an embodiment.

FIG. 4 is a cross-sectional view of the input sensing layer ISP according to an embodiment and FIG. 5 is a plan view of the input sensing layer ISP and a sensing controller ICP according to an embodiment.

Referring to FIGS. 4 and 5, the input sensing layer ISP includes a first sensing insulating layer IIL1, a first conductive layer ICL1, a second sensing insulating layer IIL2, a second conductive layer ICL2, and a third sensing insulating layer IIL3. The first sensing insulating layer IIL1 is disposed directly on the encapsulation layer ENP. According to an embodiment, the first sensing insulating layer IIL1 may be omitted.

Each of the first conductive layer ICL1 and the second conductive layer ICL2 includes a plurality of conductive patterns. The conductive patterns include a plurality of sensing electrodes SE1_1 to SE1_5 and SE2_1 to SE2_4 and a plurality of signal lines SL1_1 to SL1_5 and SL2_1 to SL2_4 connected to the sensing electrodes SE1_1 to SE1_5 and SE2_1 to SE2_4.

Each of the first sensing insulating layer IIL1 the second sensing insulating layer IIL2, and the third sensing insulating layer IIL3 includes one of an inorganic material or an organic material. In the present embodiment, each of the first sensing insulating layer IIL1 and the second sensing insulating layer IIL2 is an inorganic layer. The inorganic layer includes at least one of aluminum oxide, titanium oxide, silicon oxide, silicon oxynitride, zirconium oxide, and hafnium oxide. The inorganic layer has a thickness of about 1000 angstroms to about 4000 angstroms.

The third sensing insulating layer IIL3 is an organic layer and includes at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin. The third sensing insulating layer IIL3 including the organic material may prevent moisture from entering the first conductive layer ICL1 and the second conductive layer ICL2 from the outside.

Referring to FIG. 5, according to an embodiment, the input sensing layer ISP includes a sensing area TA and a non-sensing area NTA adjacent to the sensing area TA. As an example, the sensing area TA corresponds to at least a portion of the effective area AA of the display module DM (refer to FIG. 2). As an example, the sensing area TA corresponds to the effective area AA of the display module DM, and the non-sensing area NTA corresponds to the non-effective area NAA of the display module DM. As an example, the sensing area TA includes a first sensing area TA1 and a second sensing area TA2. The second sensing area TA2 is disposed between the first sensing area TA1 and the non-sensing area NTA. The second sensing area TA2 is located adjacent to the first sensing area TA1. As an example, the second sensing area TA2 surrounds the first sensing area TA1. According to an embodiment, the second sensing area TA2 has a variety of shapes and should not be particularly limited to a particular shape or orientation.

The sensing electrodes SE1_1 to SE1_5 and SE2_1 to SE2_4 is disposed in the sensing area TA, and the signal lines SL1_1 to SL1_5 and SL2_1 to SL2_4 is disposed in the non-sensing area NTA.

As an example, the sensing electrodes SE1_1 to SE1_5 and SE2_1 to SE2_4 includes transmission electrodes SE1_1 to SE1_5 and reception electrodes SE2_1 to SE2_4.

The signal lines SL1_1 to SL1_5 and SL2_1 to SL2_4 includes transmission signal lines SL1_1 to SL1_5 connected to the transmission electrodes SE1_1 to SE1_5 and reception signal lines SL2_1 to SL2_4 connected to the reception electrodes SE2_1 to SE2_4.

The transmission electrodes SE1_1 to SE1_5 cross the reception electrodes SE2_1 to SE2_4. The transmission electrodes SE1_1 to SE1_5 are arranged in the first direction DR1 and extend in the second direction DR2. The reception electrodes SE2_1 to SE2_4 are arranged in the second direction DR2 and extend in the first direction DR1.

The input sensing layer ISP obtains coordinate information by a mutual capacitance method. A capacitor is formed between the transmission electrodes SE1_1 to SE1_5 and the reception electrodes SE2_1 to SE2_4. A capacitance of the capacitor between the transmission electrodes SE1_1 to SE1_5 and the reception electrodes SE2_1 to SE2_4 is changed by the first input or the second input TC (See FIG. 1). The sensitivity of the input sensing layer ISP is determined depending on a variation in capacitance.

Each of the transmission electrodes SE1_1 to SE1_5 include first sensor portions SSP1 and first connection portions CP1, which are arranged in the sensing area TA. As an example, each of the first connection portions CP1 connect the first sensor portions SSP1 adjacent to each other. The first sensor portions SSP1 included in one transmission electrode is connected to the first connection portions CP1 and extend in the second direction DR2. Each of the reception electrodes SE2_1 to SE2_4 include second sensor portions SSP2 and second connection portions CP2, which are arranged in the sensing area TA. As an example, each of the second connection portions CP2 connect the second sensor portions SSP2 adjacent to each other. The second sensor portions SSP2 included in one reception electrode is connected to the second connection portions CP2 and extend in the first direction DR1.

The transmission electrodes SE1_1 to SE1_5 and the reception electrodes SE2_1 to SE2_4 has a mesh shape. As the transmission electrodes SE1_1 to SE1_5 and the reception electrodes SE2_1 to SE2_4 have the mesh shape, a parasitic capacitance between electrodes included in the display panel DP (See FIG. 2) and the transmission electrodes SE1_1 to SE1_5 and the reception electrodes SE2_1 to SE2_4 is reduced.

The transmission electrodes SE1_1 to SE1_5 and the reception electrodes SE2_1 to SE2_4, which have the mesh shape, may include silver, aluminum, copper, chromium, nickel, titanium, or the like, however, materials for the transmission electrodes SE1_1 to SE1_5 and the reception electrodes SE2_1 to SE2_4 should not be limited thereto.

FIG. 5 shows the transmission electrodes SE1_1 to SE1_5 and the reception electrodes SE2_1 to SE2_4, however, the shape of the transmission electrodes SE1_1 to SE1_5 and the reception electrodes SE2_1 to SE2_4 should not be limited thereto. According to an embodiment, the transmission electrodes SE1_1 to SE1_5 and the reception electrodes SE2_1 to SE2_4 may have a shape in which the sensor portion is not distinguished from the connection portion, for example, a bar shape. In addition, the first sensor portions SSP1 and the second sensor portions SSP2 may have a lozenge shape, however, they should not be limited thereto. According to an embodiment, the first sensor portions SSP1 and the second sensor portions SSP2 may have different polygonal shapes from each other.

The transmission signal lines SL1_1 to SL1_5 and the reception signal lines SL2_1 to SL2_4 are disposed in the non-sensing area NTA.

The input sensing layer ISP includes input pads I_PD extending from one end of the transmission signal lines SL1_1 to SL1_5 and the reception signal lines SL2_1 to SL2_4 and disposed in the non-sensing area NTA. The input pads I_PD are electrically connected to the transmission signal lines SL1_1 to SL1_5 and the reception signal lines SL2_1 to SL2_4. As an example, the input pads I_PD includes a transmission input pad I_PD1 electrically connected to the transmission signal lines SL1_1 to SL1_5 and a reception input pad I_PD2 electrically connected to the reception signal lines SL2_1 to SL2_4.

The display device DD (See FIG. 2) further includes the sensing controller ICP to control an operation of the input sensing layer ISP.

As an example, the sensing controller ICP is electrically connected to the input sensing layer ISP. The sensing controller ICP is electrically connected to the transmission signal lines SL1_1 to SL1_5 and the reception signal lines SL2_1 to SL2_4 via the input pads I_PD.

Referring to FIGS. 5 and 6, the sensing controller ICP transmits a driving control signal TS to the transmission electrodes SE1_1 to SE1_5 and receives a sensing signal SS read out from the reception electrodes SE2_1 to SE2_4. As an example, the driving control signal TS includes a driving control signal sequentially transmitted to each of the transmission electrodes SE1_1 to SE1_5. The sensing signal SS is a signal induced to the reception electrodes SE2_1 to SE2_4 by the capacitor formed between the transmission electrodes SE1_1 to SE1_5 and the reception electrodes SE2_1 to SE2_4 when the first input or the second input TC is applied to the display device DD. As an example, the sensing controller ICP transmits the driving control signal TS to the transmission electrodes SE1_1 to SE1_5 to sense the first input when the first input is applied to the display device DD. When the second input TC is applied to the display device DD, the second input TC is sensed based on the sensing signal SS generated by the second input TC even though the sensing controller ICP does not transmit the driving control signal TS to the transmission electrodes SE1_1 to SE1_5.

FIG. 6 is a block diagram of the electronic device ED according to an embodiment of the inventive concept.

Referring to FIG. 6, the electronic device ED includes the display device DD and the external input device AP. The display device DD includes the display panel DP, the input sensing layer ISP, a main controller MCP, a panel controller DCP, and the sensing controller ICP.

The input sensing layer ISP is disposed on the display panel DP and senses an input applied thereto from an external source. The input sensing layer ISP senses the first input and the second input TC generated by the external input device AP (See FIG. 1). Hereinafter, an embodiment in which the input sensing layer ISP senses the second input TC generated by the external input device AP will be described.

The main controller MCP controls an overall operation of the display device DD. As an example, the main controller MCP controls the operations of the panel controller DCP and the sensing controller ICP.

The panel controller DCP receives image data RGB and a control signal D_CS from the main controller MCP. The panel controller DCP generates display signals based on the received image data RGB and the control signal D_CS to drive the display panel DP. As an example, the control signal D_CS provided by the main controller MCP includes a variety of signals. As an example, the control signal D_CS may include, e.g., a vertical synchronization signal, a horizontal synchronization signal, a main clock signal, and a data enable signal. The panel controller DCP generates a vertical start signal and a horizontal start signal based on the control signal D_CS received from the main controller MCP to control a timing at which signals are applied to the display panel DP.

The sensing controller ICP controls the input sensing layer ISP. The sensing controller ICP receives a sensing control signal I_CS from the main controller MCP. The sensing control signal I_CS includes a sensing clock signal and a signal including information about a relation between a driving frequency of the input sensing layer ISP and a driving frequency of the display panel DP. The sensing controller ICP determines the driving frequency of the input sensing layer ISP based on the sensing control signal I_CS and generates the driving control signal TS (See FIG. 5). The sensing controller ICP transmits the driving control signal TS to the input sensing layer ISP such that the input sensing layer ISP is operated at the determined driving frequency.

The sensing controller ICP receives the sensing signal SS (See FIG. 5) from the input sensing layer ISP and calculates input information about the external input device AP based on the received sensing signal SS. As an example, the input information of the external input device AP calculated by the sensing controller ICP includes information, such as coordinate information of the external input device AP and tilt information and operation mode information of the external input device AP, which are provided to the display device DD. The sensing controller ICP provides input information I_SS including the input information of the external input device AP to the main controller MCP. The main controller MCP performs an operation corresponding to the second input TC generated by the external input device AP based on the input information I_SS provided by the sensing controller ICP. As an example, the main controller MCP drives the panel controller DCP such that new images are displayed through the display panel DP based on the input information I_SS.

The external input device AP includes a resonant circuit 100, a signal generator 200, a power supply 300, a housing 400, and a pen electrode 500, however, it should not be limited thereto. According to an embodiment, the external input device AP further includes an electrode switch to switch a signal transmission mode to a signal reception mode or vice versa, a pressure sensor to sense a pressure, a memory to store predetermined information, or a gyro sensor to sense rotation.

The housing 400 has a pen shape and includes an accommodation space defined therein. The resonant circuit 100, the signal generator 200, and the power supply 300 are accommodated in the accommodation space defined in the housing 400. The pen electrode 500 is disposed at an end of the housing 400. As an example, a portion of the pen electrode 500 is exposed to the outside of the housing 400, and the other portion of the pen electrode 500 is inserted into the housing 400.

The resonant circuit 100 is a resonant circuit 100 including an inductor and a capacitor. The capacitor stores a current flow by a reception signal applied to the external input device AP as an electric field, and the inductor stores the current flow by the reception signal as a magnetic field. The inductor includes a magnetic material and a coil wound around the magnetic material.

The signal generator 200 generates a transmission signal transmitted to the outside from the external input device AP. The signal generator 200 includes an integrated circuit for a specific purpose or an oscillator. The signal generator 200 outputs an alternating current signal with a predetermined frequency. As an example, the signal generated by the signal generator 200 is a fixed frequency signal. The signal may be a sine wave of about 560 kHz, however, it should not be particularly limited.

The capacitor included in the resonant circuit 100 is charged with the transmission signal generated by the signal generator 200. Accordingly, the signal generator 200 stops generating the transmission signal after the capacitor of the resonant circuit 100 is charged. The induced current is generated in the resonant circuit 100 by the transmission signal, and the resonant circuit 100 resonates by the induced current to emit an electromagnetic signal EMS. As an example, the electromagnetic signal EMS emitted from the resonant circuit 100 includes a magnetic field. As an example, the reception electrodes SE2_1 to SE2_4 (See FIG. 5) included in the input sensing layer ISP resonates with the electromagnetic signal EMS provided from the external input device AP and generates the sensing signal SS, however, it should not be limited thereto. According to an embodiment, when the second input TC is provided to the display device DD from the external input device AP, the transmission electrodes SE1_1 to SE1_5 (See FIG. 5) included in the input sensing layer ISP is used as an electrode to receive the electromagnetic signal EMS provided by the external input device AP. In this case, the transmission electrodes SE1_1 to SE1_5 may also resonate with the electromagnetic signal EMS and may generate the sensing signal SS.

According to an embodiment, the external input device AP includes the signal generator 200. Accordingly, the external input device AP is operated in an active mode to generate the electromagnetic signal EMS without the need for a separate signal to be applied to the external input device AP to generate the electromagnetic signal EMS. Accordingly, while the display device DD does not include a digitizer that generates a separate signal, the electronic device ED may sense an input of the external input device AP that outputs the electromagnetic signal EMS.

Figure 7A:
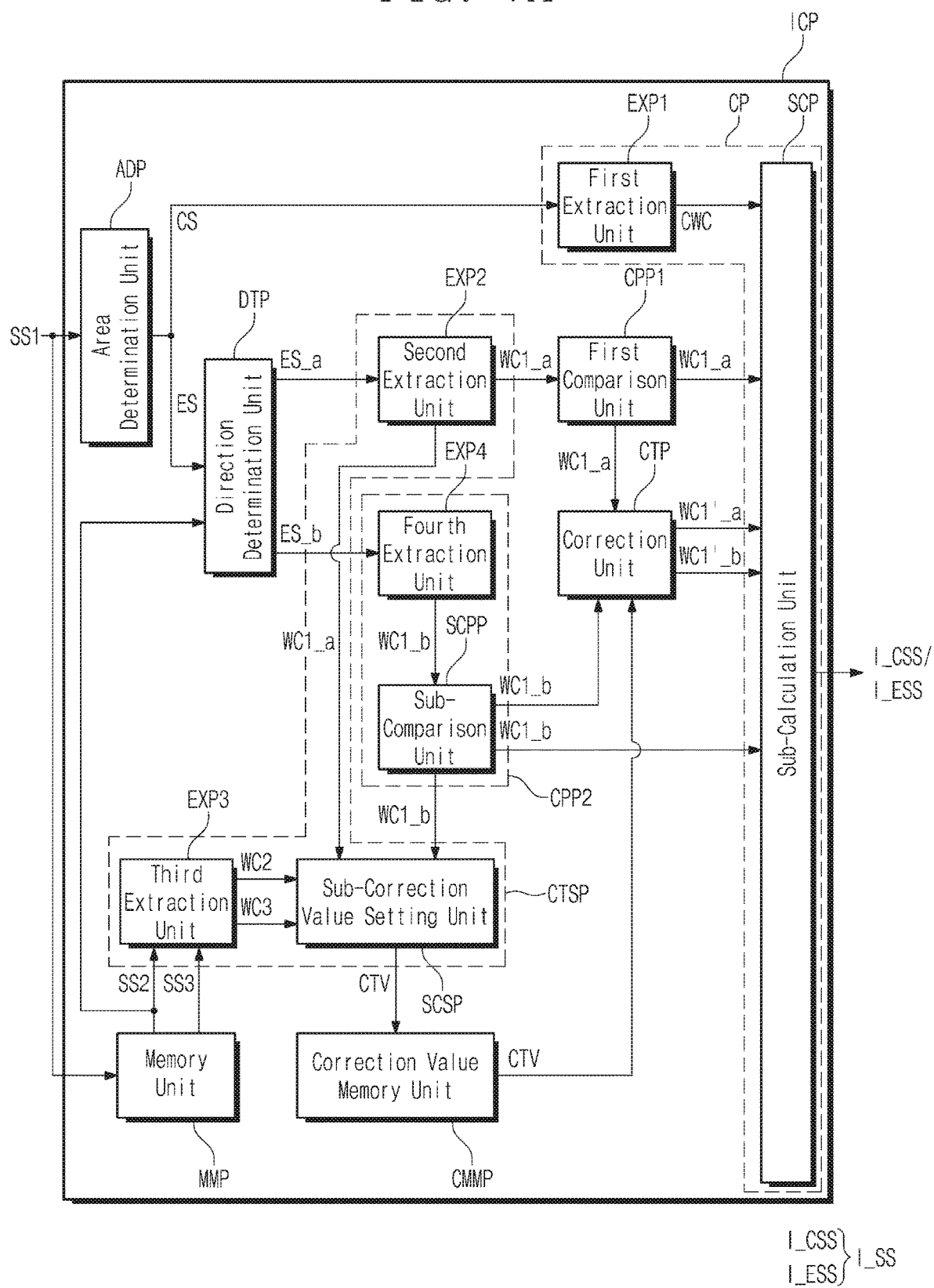
FIGS. 7A and 7B are block diagrams of a sensing controller, according to an embodiment.
Figure 7B:
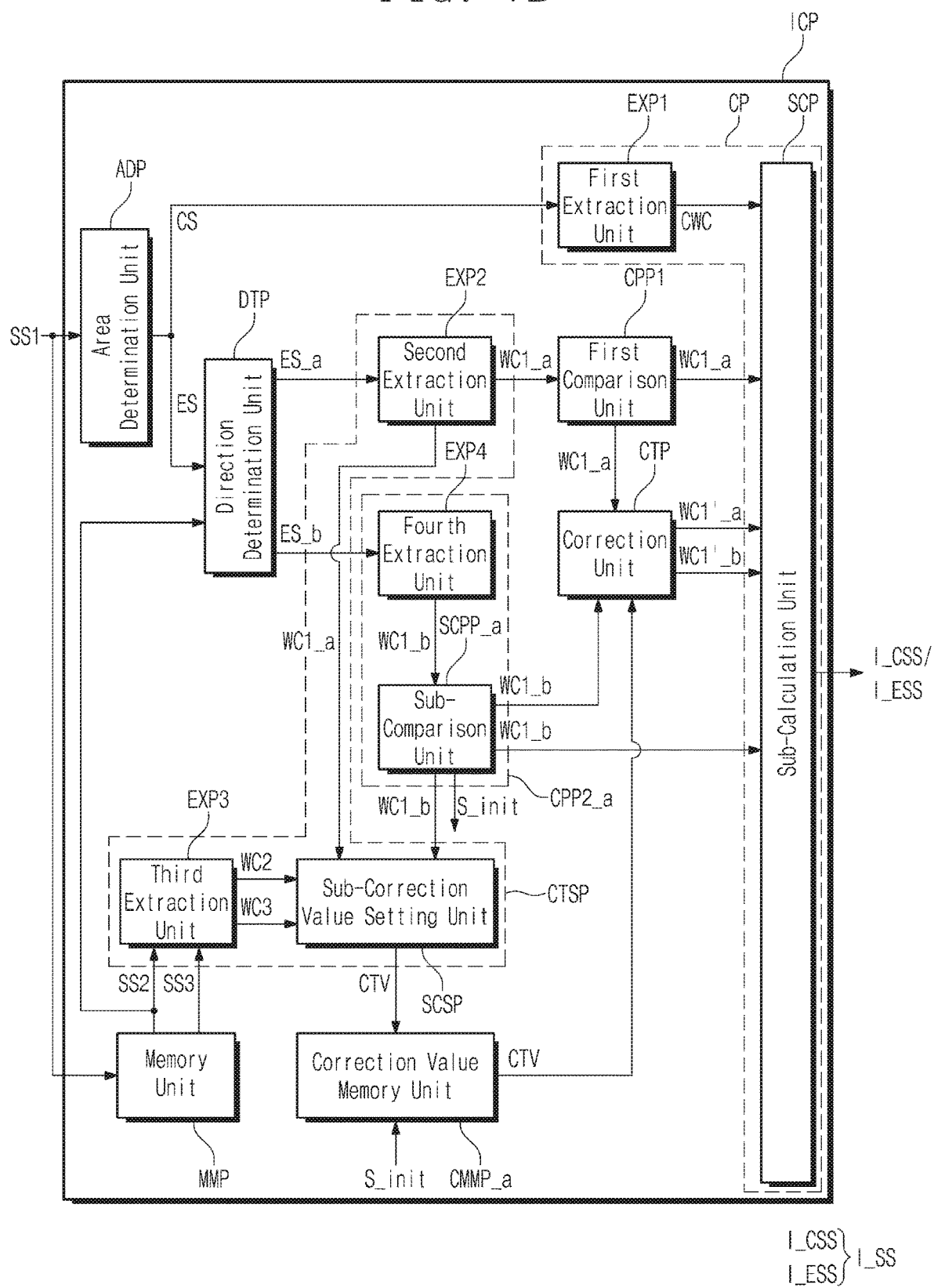
Figure 8:
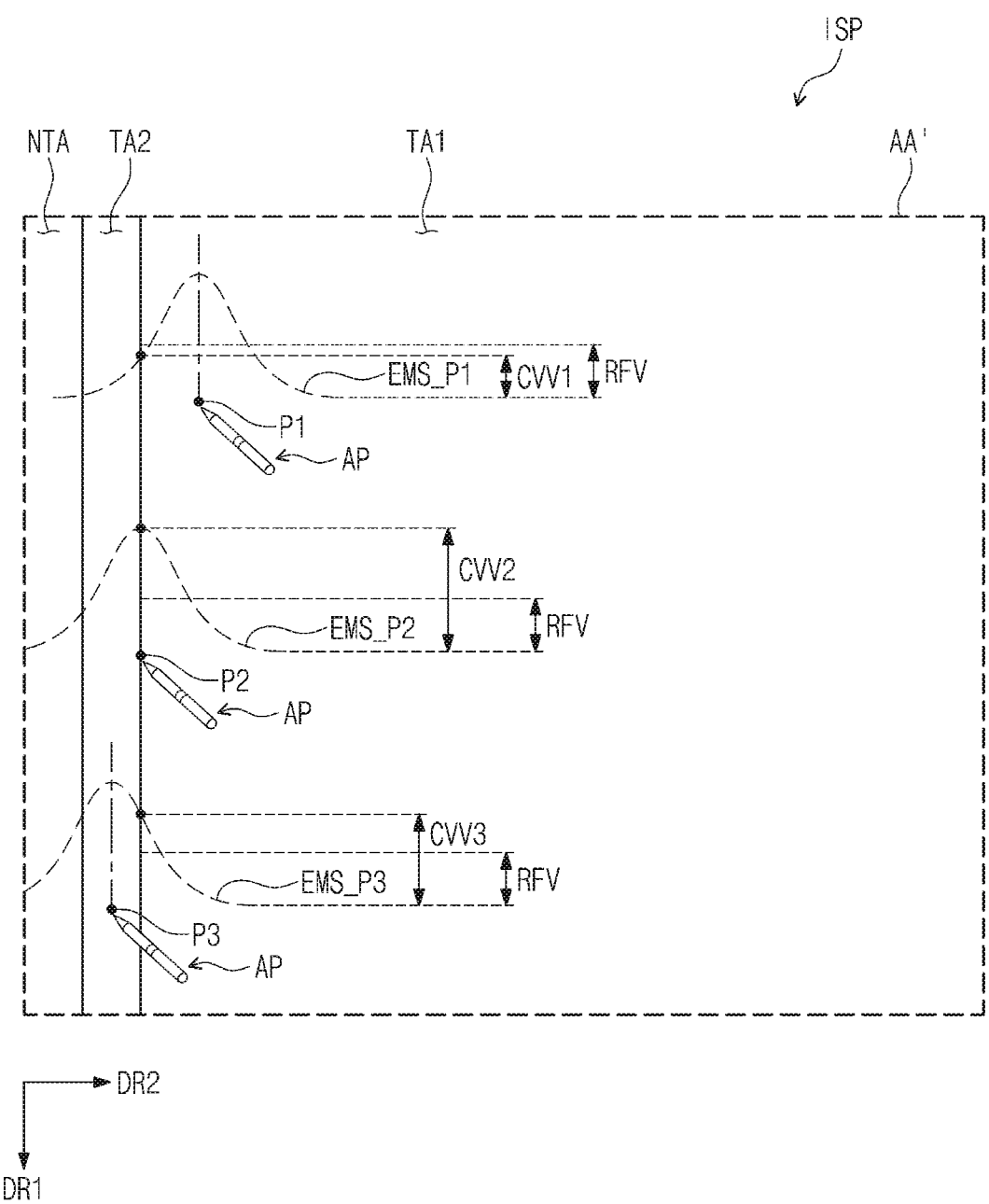
FIG. 8 is a conceptual view of an area AA' of FIG. 5 highlighting an area determination unit, according to an embodiment.

FIGS. 7A and 7B are block diagrams of the sensing controller ICP according to an embodiment of the inventive concept. FIG. 8 is a conceptual view of an area AA' of FIG. 5 (the input sensing layer and sensing controller) to explain an area determination unit ADP according to an embodiment of the inventive concept.

FIGS. 9A to 9E are conceptual views of the area AA' of FIG. 5 directed to a direction determination unit DTP according to an embodiment of the inventive concept.

Figure 10:
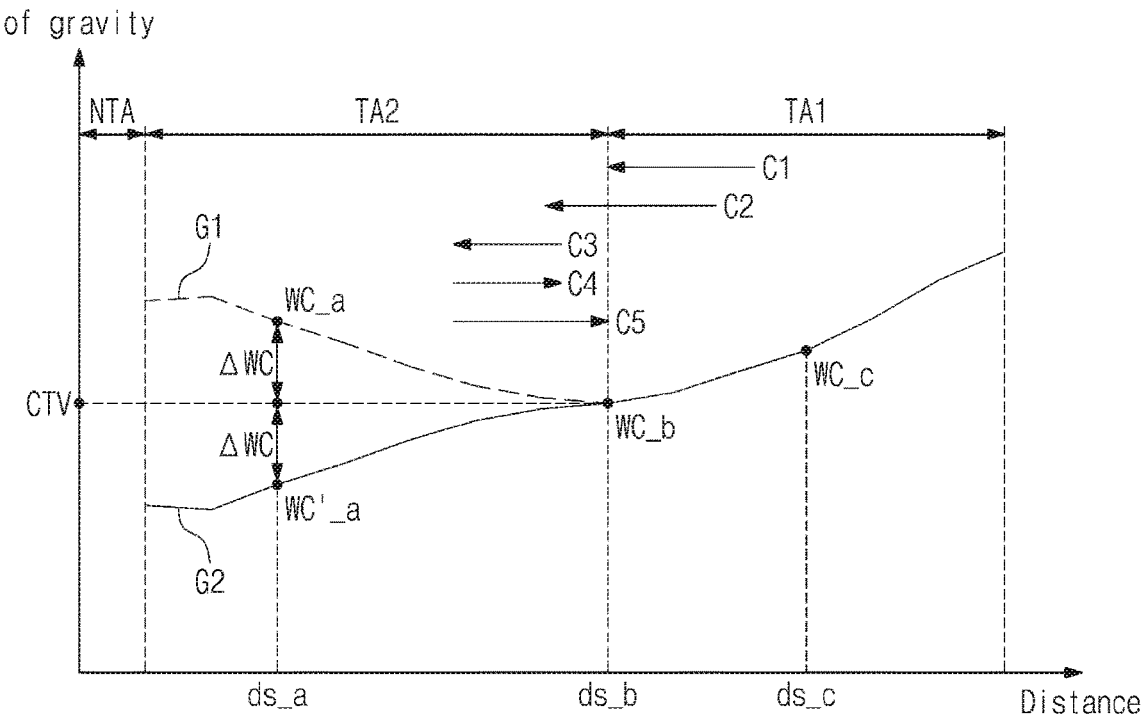
FIG. 10 is a graph illustrating a correction unit, according to an embodiment.

FIG. 10 is a graph explaining a correction unit CTP according to an embodiment of the inventive concept.

Referring to FIG. 7A, the sensing controller ICP includes an area determination unit ADP, a direction determination unit DTP, a correction value setting unit CTSP, a correction unit CTP, a memory unit MMP, a calculation unit CP, a first comparison unit CPP1, and a second comparison unit CPP2.

Referring to FIGS. 7A and 8, the external input device AP provides the second input TC to a plurality of positions P1, P2, and P3 of the input sensing layer ISP. As an example, an electromagnetic signal EMS_P1 provided to the input sensing layer ISP at a first position P1 positioned in the first sensing area TA1 of the input sensing layer ISP by the external input device AP is referred to as a first electromagnetic signal EMS_P1. An electromagnetic signal EMS_P2 provided to the input sensing layer ISP at a second position P2 positioned at a boundary between the first sensing area TA1 and the second sensing area TA2 of the input sensing layer ISP by the external input device AP is referred to as a second electromagnetic signal EMS_P2. An electromagnetic signal EMS_P3 provided to the input sensing layer ISP at a third position P3 positioned in the second sensing area TA2 of the input sensing layer ISP by the external input device AP is referred to as a third electromagnetic signal EMS_P3.

The input sensing layer ISP resonates with a single electromagnetic signal, which may be one of the first, second, and third electromagnetic signal EMS_P1, EMS_P2, and EMS_P3 provided from the external input device AP in a current frame and generates therefrom a first sensing signal SS1. Where the first sensing signal SS1 is defined as a sensing signal generated by the input sensing layer ISP in the current frame.

The area determination unit ADP receives the first sensing signal SS1 from the input sensing layer ISP. The area determination unit ADP compares the first sensing signal SS1 with a predetermined reference value RFV to determine which electromagnetic signal is the generating source of the first sensing signal SS1, from among the various electromagnetic signals provided to the respective first, second, and third positions P1, P2, and P3 of the input sensing layer ISP. As an example, the reference value RFV is determined by accounting for a size of the display device DD (See FIG. 1), a sensing resolution of the input sensing layer ISP, a size of the non-sensing area NTA, and the like. The area determination unit ADP compares measured value (e.g., the measured value CVV1, CVV2, or CVV3 described later) corresponding to the first sensing signal SS1 with the reference value RFV to determine which electromagnetic signal, among the electromagnetic signals provided to the first, second, and third positions P1, P2, and P3 of the input sensing layer ISP from the external input device AP, generates the first sensing signal SS1

FIG. 8 shows the measured values CVV1, CVV2, and CVV3 based on the first, second, and third electromagnetic signal EMS_P1, EMS_P2, and EMS_P3. The area determination unit ADP determines the first sensing signal SS1 as a center signal CS generated in the first sensing area TA1 when the measured value is less than the reference value RFV (e.g., the case of measured value CVV1). The area determination unit ADP determines the first sensing signal SS1 as an edge signal ES generated in the second sensing area TA2 when the measured value is equal to or greater than the reference value RFV (e.g., the case of measured value CVV2 or CVV3).

As an example, the measured value CVV1 measured when the second input TC is provided to the first position P1 is referred to as a first measured value CVV1. The measured value CVV2 measured when the second input TC is provided to the second position P2 is referred to as a second measured value CVV2. The measured value CVV3 measured when the second input TC is provided to the third position P3 is referred to as a third measured value CVV3. When the second input TC is provided to the first position P1, the area determination unit ADP determines the first sensing signal SS1 as the center signal CS since the first measured value CVV1 is less than the reference value RFV. When the second input TC is provided to the second position P2, the area determination unit ADP determines the first sensing signal SS1 as the edge signal ES since the second measured value CVV2 is greater than the reference value RFV. When the second input TC is provided to the third position P3, the area determination unit ADP determines the first sensing signal SS1 as the edge signal ES since the third measured value CVV3 is greater than the reference value RFV.

As an example, in the case where the first sensing signal SS1 is determined to be the center signal CS, the area determination unit ADP provides the center signal CS to the calculation unit CP. When the input information I_SS provided by the sensing controller ICP includes center input information I_CSS provided to the first sensing area TA1 and edge input information I_ESS provided to the second sensing area TA2 the calculation unit CP may calculate the center input information I_CSS based on the center signal CS. The calculation unit CP includes a first extraction unit EXP1 and a sub-calculation unit SCP. The first extraction unit EXP1 receives the center signal CS from the area determination unit ADP and extracts a center of gravity (hereinafter, referred to as a center signal center of gravity CWC) of the center signal CS based on values for each location of the input sensing layer ISP included in the center signal CS. The sub-calculation unit SCP receives the center signal center of gravity CWC from the first extraction unit EXP1 and may calculate the center input information I_CSS based on the center signal center of gravity CWC.

Figure 9A:
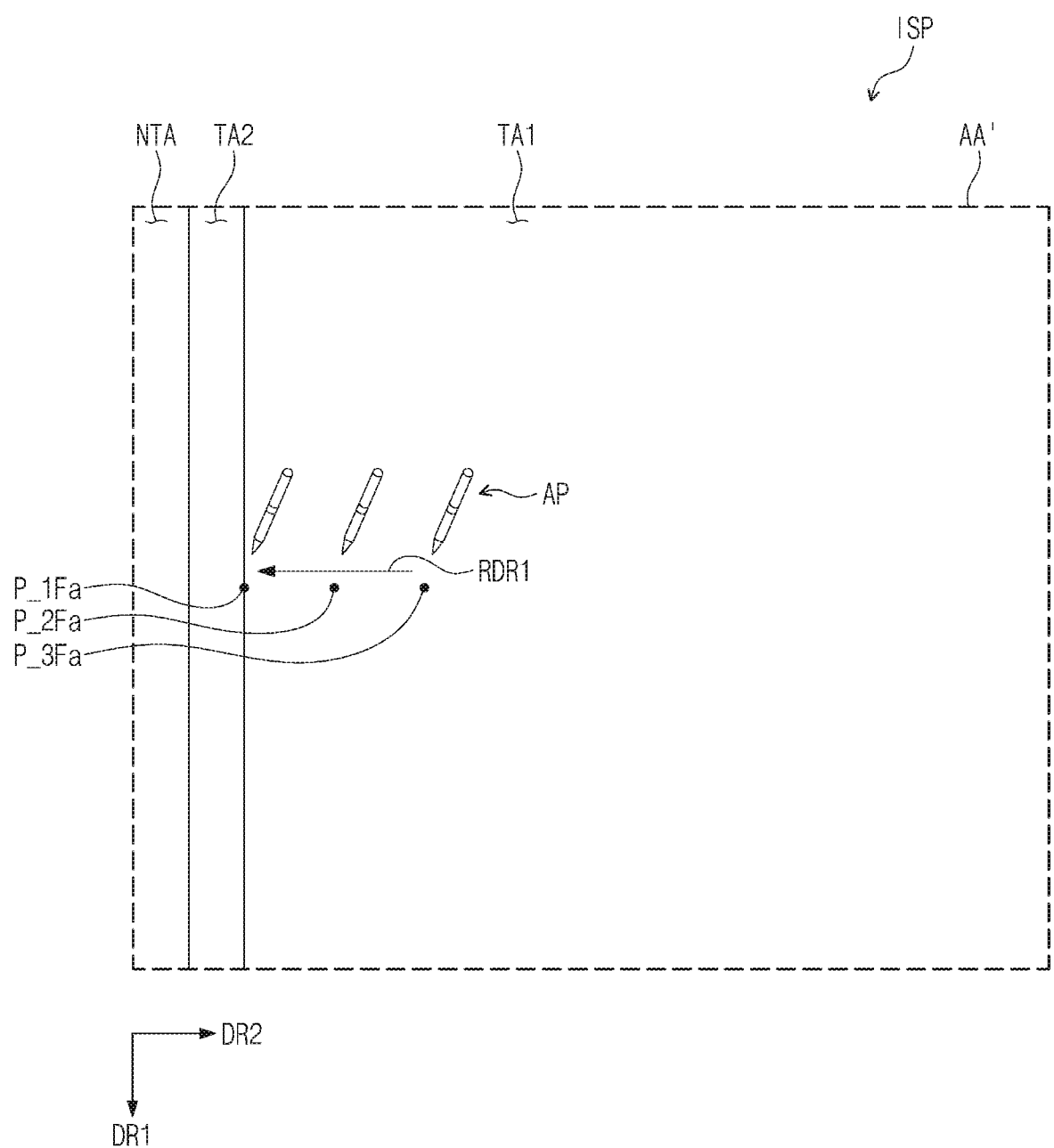
FIGS. 9A to 9E are conceptual views of the area AA' of FIG. 5 highlighting a direction determination unit, according to an embodiment.

Referring to FIGS. 7A and 9A, the external input device AP provides the electromagnetic signal EMS (See FIG. 6) to the display device DD over a plurality of frames. As an example, when the current frame is defined as a first frame, the input sensing layer ISP generates the first sensing signal SS1 in response to the electromagnetic signal EMS provided from the external input device AP in the first frame. A second frame is defined herein as a frame that occurs right before the first frame. The input sensing layer ISP generates the second sensing signal SS2 in response to the electromagnetic signal EMS provided from the external input device AP in the second frame. A frame that occurs right before the second frame is defined herein as a third frame. The input sensing layer ISP generates the third sensing signal SS3 in response to the electromagnetic signal EMS provided from the external input device AP in the third frame. The second frame may be referred to as a first previous frame, and the third frame may be referred to as a second previous frame.

As an example, the sensing signals SS1, SS2, and SS3 provided in every frame to the sensing controller ICP are stored in the memory unit MMP. The first sensing signal SS1 provided in the first frame, the second sensing signal SS2 provided in the second frame, and the third sensing signal SS3 provided in the third frame are all stored in the memory unit MMP.

A point at which the external input device AP provides the electromagnetic signal EMS to the input sensing layer ISP in the first frame is referred to as a first point P_1Fa. A point at which the external input device AP provides the electromagnetic signal EMS to the input sensing layer ISP in the second frame is referred to as a second point P_2Fa. A point at which the external input device AP provided the electromagnetic signal EMS to the input sensing layer ISP in the third frame is referred to as a third point P_3Fa.

As an example, when the first sensing signal SS1 is determined to be an edge signal ES, the area determination unit ADP provides the edge signal ES to the direction determination unit DTP. The direction determination unit DTP then receives the edge signal ES from the area determination unit ADP and receives the second sensing signal SS2 from the memory unit MMP. The direction determination unit DTP may determine a movement direction of the external input device AP based on the received edge signal ES and the received second sensing signal SS2 from the memory unit MMP. More particularly, the direction determination unit DTP compares a distribution of values included in the edge signal ES with a distribution of values included in the second sensing signal SS2 and may determine the movement direction of the external input device AP, based on the outcome of the comparison. In the present embodiment, the direction determination unit DTP receives the second sensing signal SS2 from the memory unit MMP, however, the inventive concept should not be limited thereto.

According to another embodiment, the direction determination unit DTP receives the second sensing signal SS2 and the third sensing signal SS3 from the memory unit MMP and may determine the movement direction of the external input device AP based on the first, second, and third sensing signals SS1, SS2, and SS3. In this case, the direction determination unit DTP compares the distribution of the values included in the edge signal ES, the distribution of the values included in the second sensing signal SS2, and the distribution of the values included in the third sensing signal SS3 and may determine the movement direction of the external input device AP. The operation of the direction determination unit DTP to determine the movement direction of the external input device AP based on the first to third sensing signals SS1, SS2, and SS3 will be further described with reference to FIGS. 9A to 9E.

Referring to FIG. 9A, in a case where the external input device AP moves to a position adjacent to the second sensing area TA2, away from the first sensing area TA1 over the first to third frames, the direction determination unit DTP may determine that the movement direction of the external input device AP is a first reference direction RDR1 toward the second sensing area TA2, away from the first sensing area TA1. As shown in FIG. 9A, the first reference direction RDR1 is shown to be opposite to the second direction DR2. In a case where the second sensing area is disposed at one side, e.g., a left side, of the first sensing area, the first reference direction RDR1 is opposite to the second direction DR2, however, the inventive concept should not be limited thereto. As an example, in a case where the second sensing area is disposed at the other side, e.g., a right side, of the first sensing area, the first reference direction RDR1 is the same as the second direction DR2.

Figure 9B:
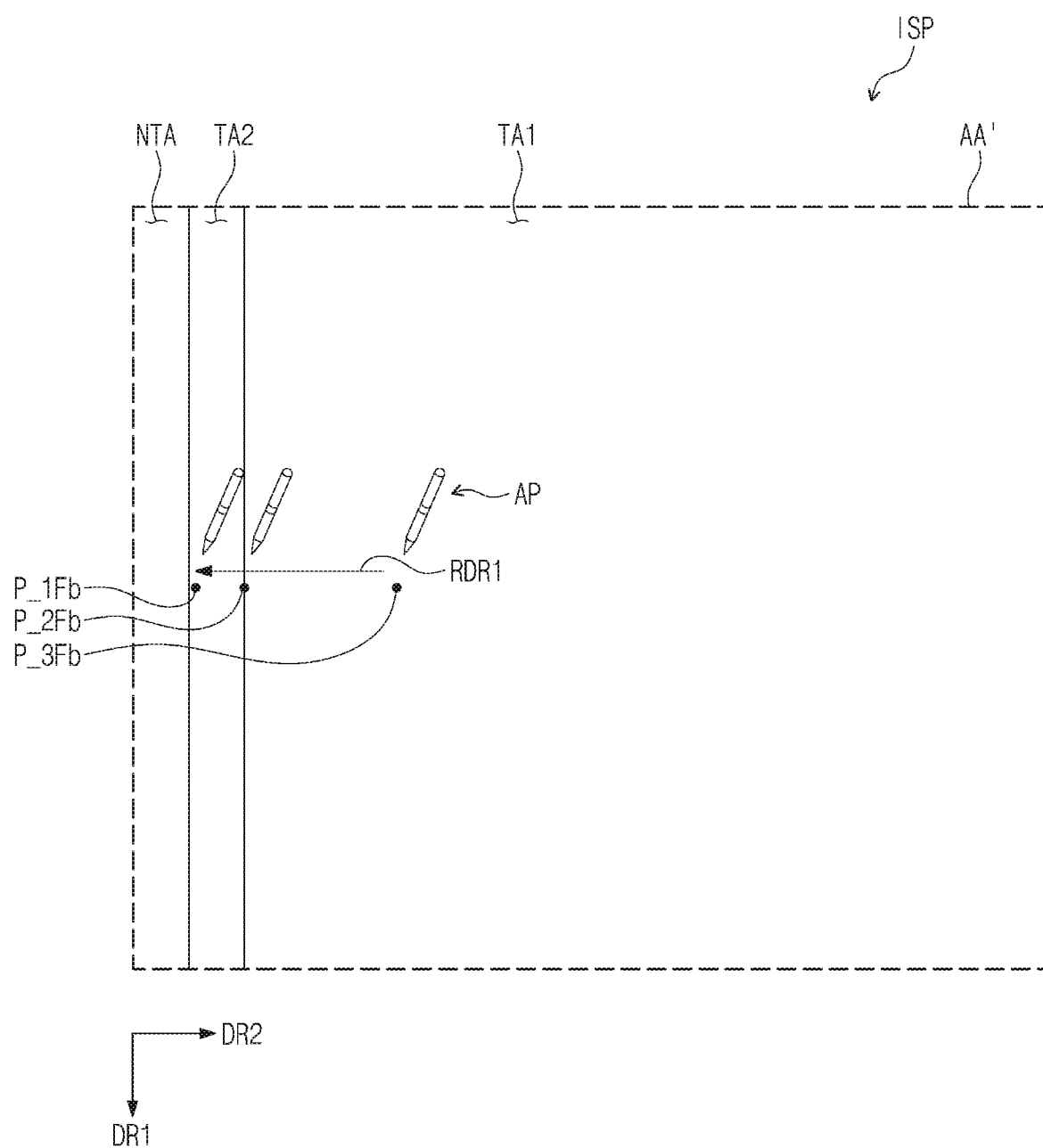

Referring to FIG. 9B, a point at which the external input device AP provides the electromagnetic signal EMS to the input sensing layer ISP in the first frame is referred to as a fourth point P_1Fb. A point at which the external input device AP provides the electromagnetic signal EMS to the input sensing layer ISP in the second frame is referred to as a fifth point P_2Fb. A point at which the external input device AP provides the electromagnetic signal EMS to the input sensing layer ISP in the third frame is referred to as a sixth point P_3Fb.

As shown in FIG. 9B, in a case where the external input device AP moves to a position in the second sensing area TA2 over the first to third frames and the fourth point P_1Fb is placed in the second sensing area TA2, the direction determination unit DTP may determine that the movement direction of the external input device AP is the first reference direction RDR1 toward the second sensing area TA2 from the first sensing area TA1.

Figure 9C:
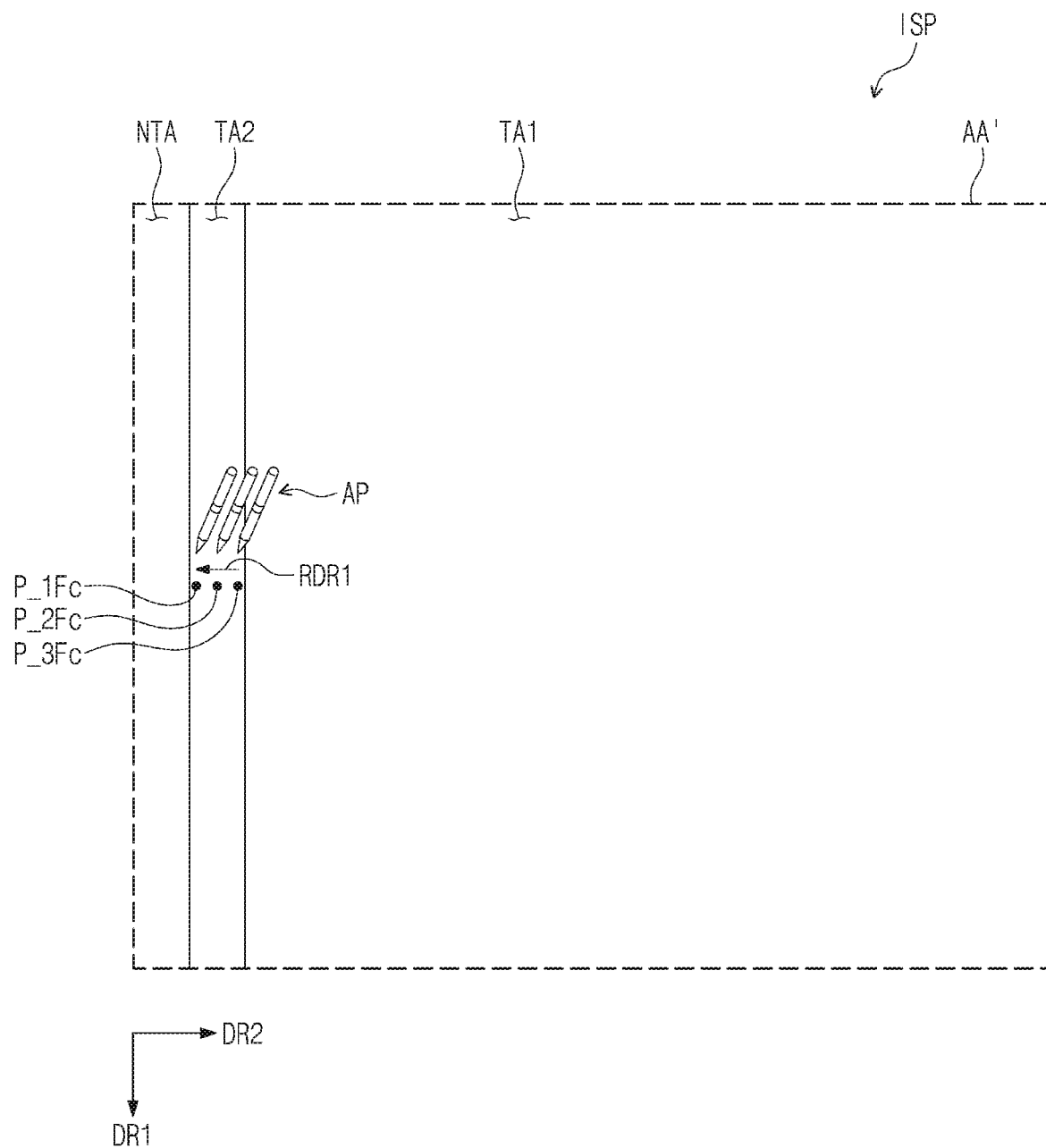

Referring to FIG. 9C, a point at which the external input device AP provides the electromagnetic signal EMS to the input sensing layer ISP in the first frame is referred to as a seventh point P_1Fc. A point at which the external input device AP provides the electromagnetic signal EMS to the input sensing layer ISP in the second frame is referred to as an eighth point P_2Fc. A point at which the external input device AP provides the electromagnetic signal EMS to the input sensing layer ISP in the third frame is referred to as a ninth point P_3Fc.

As shown in FIG. 9C, in a case where the external input device AP moves to a position adjacent to the non-sensing area NTA in the second sensing area TA2 over the first to third frames, the direction determination unit DTP may determine that the movement direction of the external input device AP is the first reference direction RDR1 toward the second sensing area TA2 from the first sensing area TA1.

Figure 9D:
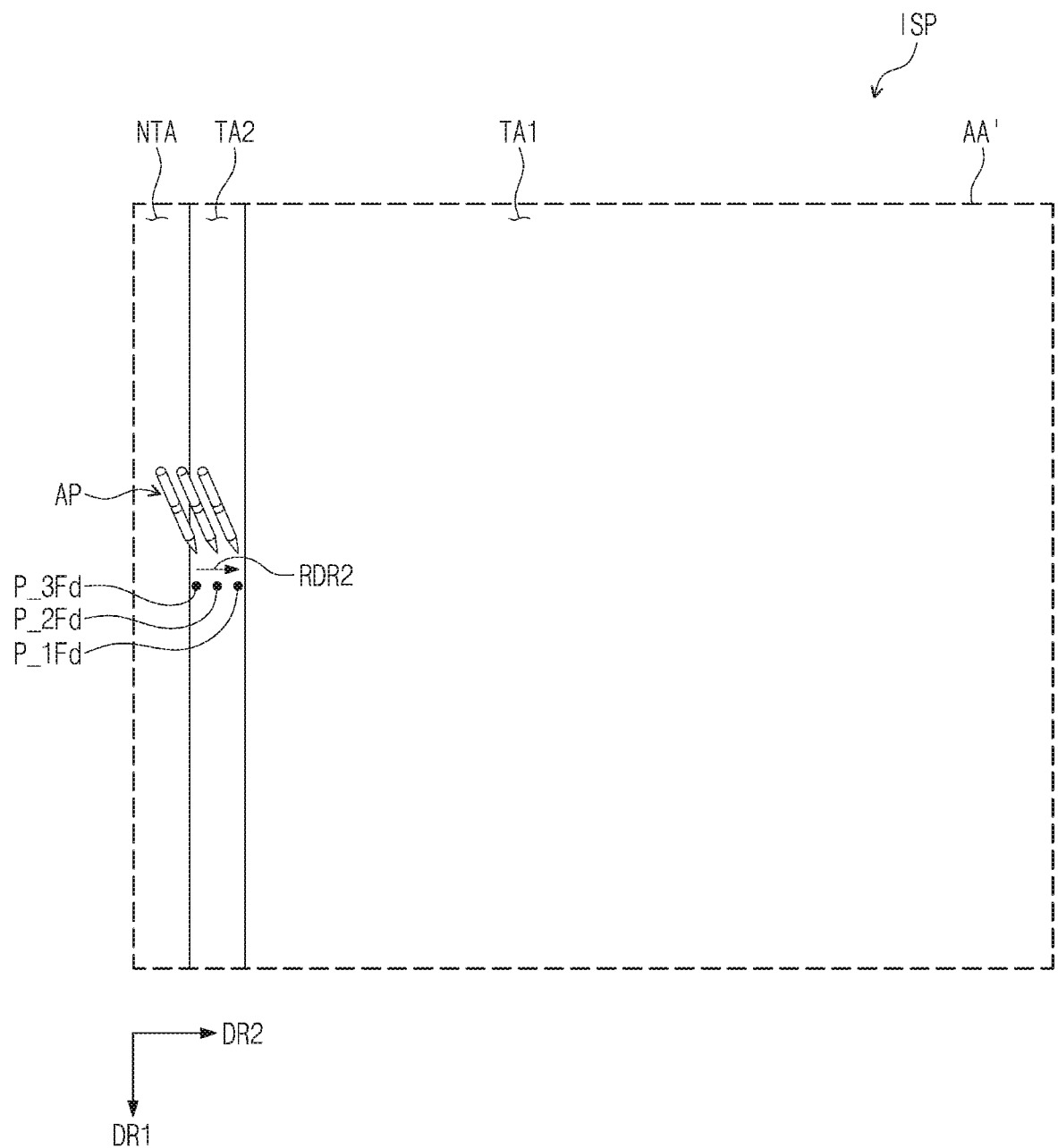

Referring to FIG. 9D, a point at which the external input device AP provides the electromagnetic signal EMS to the input sensing layer ISP in the first frame is referred to as a tenth point P_1Fd. A point at which the external input device AP provides the electromagnetic signal EMS to the input sensing layer ISP in the second frame is referred to as an eleventh point P_2Fd. A point at which the external input device AP provides the electromagnetic signal EMS to the input sensing layer ISP in the third frame is referred to as a twelfth point P_3Fd.

As shown in FIG. 9D, in a case where the external input device AP moves to a position adjacent to the first sensing area TA1 in the second sensing area TA2, over the first to third frames, the direction determination unit DTP may determine that the movement direction of the external input device AP is a second reference direction RDR2 toward the first sensing area TA1 from the second sensing area TA2. Notably, the second reference direction RDR2 is opposite to the first reference direction RDR1.

Figure 9E:
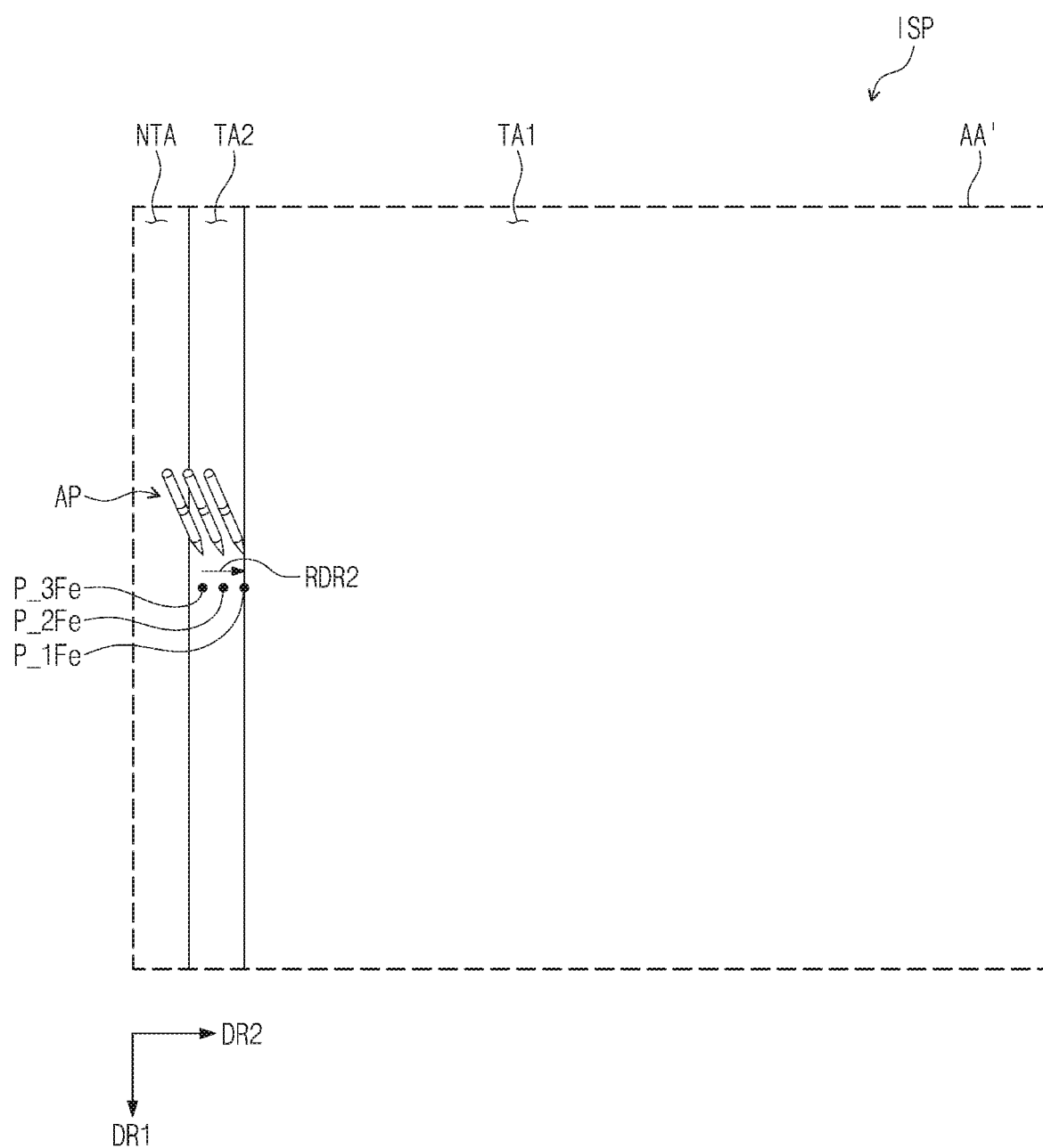

Referring to FIG. 9E, a point at which the external input device AP provides the electromagnetic signal EMS to the input sensing layer ISP in the first frame is referred to as a thirteenth point P_1Fe. A point at which the external input device AP provides the electromagnetic signal EMS to the input sensing layer ISP in the second frame is referred to as a fourteenth point P_2Fe. A point at which the external input device AP provides the electromagnetic signal EMS to the input sensing layer ISP in the third frame is referred to as a fifteenth point P_3Fe.

As shown in FIG. 9E, in a case where the external input device AP moves to a position adjacent to the first sensing area TA1 in the second sensing area TA2, over the first to third frames and the thirteenth point P_1Fe is disposed at a boundary between the second sensing area TA2 and the first sensing area TA1, the direction determination unit DTP may determine that the movement direction of the external input device AP is the second reference direction RDR2 toward the first sensing area TA1 from the second sensing area TA2.

As an example, when it is determined that the movement direction of the external input device AP is the first reference direction RDR1, the direction determination unit DTP provides an edge signal ES_a in the first reference direction RDR1 to the correction value setting unit CTSP. Hereinafter, for ease of explanation, the edge signal ES_a provided in the first reference direction RDR1 is referred to as a first edge signal ES_a.

As an example, the correction value setting unit CTSP receives the first edge signal ES_a from the direction determination unit DTP and receives the second sensing signal SS2 and the third sensing signal SS3 from the memory unit MMP. The correction value setting unit CTSP may set a correction value CTV based on the first edge signal ES_a, the second sensing signal SS2, and the third sensing signal SS3.

As a further example, the correction value setting unit CTSP includes a second extraction unit EXP2, a third extraction unit EXP3, and a sub-correction value setting unit SCSP. The second extraction unit EXP2 receives the first edge signal ES_a from the direction determination unit DTP and may extract a center of gravity (hereinafter, referred to as a first edge center of gravity WC1_$a$) of the first edge signal ES_a based on the values for each location of the input sensing layer ISP included in the first edge signal ES_a.

The third extraction unit EXP3 receives the second and third sensing signals SS2 and SS3 from the memory unit MMP. The third extraction unit EXP3 may extract a center of gravity (hereinafter, referred to as a second center of gravity WC2) of the second sensing signal SS2 and a center of gravity (hereinafter, referred to as a third center of gravity WC3) of the third sensing signal SS3 based on the values for each position of the input sensing layer ISP included in each of the second and third sensing signals SS2 and SS3.

The sub-correction value setting unit SCSP receives the first edge center of gravity WC1_$a$ from the second extraction unit EXP2 and receives the second center of gravity WC2 and the third center of gravity WC3 from the third extraction unit EXP3. The sub-correction value setting unit SCSP may set the correction value CTV based on the first edge center of gravity WC1_$a$, the second center of gravity WC2, and the third center of gravity WC3. Hereinafter, a center of gravity of a sensing signal, which is provided to the correction value setting unit CTSP, of the first sensing signal SS1 sensed in the first frame is referred to as a first center of gravity. In a case where the first sensing signal SS1 corresponds to the second sensing area TA2 and has the first reference direction RDR1, the first center of gravity is the first edge center of gravity WC1_$a$. FIG. 7A is a block diagram of a sensing controller showing the configuration in which the correction value setting unit CTSP sets the correction value CTV based on the first edge center of gravity WC1_$a$, the second center of gravity WC2, and the third center of gravity WC3 as a representative example.

As an example, in a case where the first edge center of gravity WC1_$a$ is greater than the second center of gravity WC2 and the third center of gravity WC3 is greater than the second center of gravity WC2, the correction value setting unit CTSP may set the second center of gravity WC2 as the correction value CTV.

As an example, in a case where the first edge center of gravity WC1_$a$ is greater than the second center of gravity WC2 and the third center of gravity WC3 is greater than the second center of gravity WC2, the sub-correction value setting unit SCSP may set the second center of gravity WC2 as the correction value CTV.

FIG. 10 shows a first graph G1 and a second graph G2 illustrating the center of gravity of the sensing signal SS vs. the distance between the position in the input sensing layer ISP, at which the second input TC is provided, and the non-sensing area NTA calculated at each position. The first graph G1 shows a level of the center of gravity (hereinafter, referred to as a first level WC_a) before the sensing signal SS generated in the second sensing area TA2 is corrected, and the second graph G2 shows a level WC'_a of the center of gravity after the sensing signal SS generated in the second sensing area TA2 is corrected. Hereinafter, the correction value setting unit CTSP will be described with reference to the first graph G1.

As an example, when the third position P3, as shown in FIG. 8, is spaced apart from the non-sensing area NTA by a first distance ds_a, the center of gravity of the sensing signal SS, which is calculated at the third position P3, has the first level WC_a. When the second position P2 shown in FIG. 8 is spaced apart from the non-sensing area NTA by a second distance ds_b, the center of gravity of the sensing signal SS, which is calculated at the second position P2, has a second level WC_b.

When the first position P1, as shown in FIG. 8, is spaced apart from the non-sensing area NTA by the third distance ds_c, the center of gravity of the sensing signal SS, which is calculated at the first position P1, has a third level WC_c.

Referring to FIGS. 7A, 8, 9A, and 10, a first case C1 where the first point P_1Fa is disposed at the boundary between the first sensing area TA1 and the second sensing area TA2 and the external input device AP moves towards the first reference direction RDR1 is described. For ease of explanation, in the first case C1, the first point P_1Fa will be spaced apart from the non-sensing area NTA by the second distance ds_b, and the third point P_3Fa will be spaced apart from the non-sensing area NTA by the third distance ds_c.

The first edge center of gravity WC1_$a$ has the second level WC_b, the third center of gravity WC3 has the third level WC_c, and the second center of gravity WC2 has a level between the second level WC_b and the third level WC_c. In this case, the first edge center of gravity WC1_$a$ is less than the second center of gravity WC2, and the third center of gravity WC3 is greater than the second center of gravity WC2.

Accordingly, in this first case C1, the correction value setting unit CTSP does not set the second center of gravity WC2 as the correction value CTV in this first case C1.

Referring to FIGS. 7A, 8, 9B, and 10, a second case C2 where the fourth point P_1Fb is disposed in the second sensing area TA2 and the external input device AP moves to the first reference direction RDR1 is described. For ease of explanation, in the second case C2, the fourth point P_1Fb will be described as being spaced apart from the non-sensing area NTA by the first distance ds_a, the fifth point P_2Fb will be described as being spaced apart from the non-sensing area NTA by the second distance ds_b, and the sixth point P_3Fb will be described as being spaced apart from the non-sensing area NTA by the third distance ds_c. The first edge center of gravity WC1_$a$ has a first level WC_a, the third center of gravity WC3 has a third level WC_c, and the second center of gravity WC2 has second level WC_b. In this second case C2, the first edge center of gravity WC1_$a$ is greater than the second center of gravity WC2, and the third center of gravity WC3 is greater than the second center of gravity WC2.

Accordingly, in this second case C2, the correction value setting unit CTSP sets the second center of gravity WC2 as the correction value CTV in this second case C2.

Referring to FIGS. 7A, 8, 9C, and 10, a third case C3 where the seventh point P_1Fc and the ninth point P_3Fc are disposed in the second sensing area TA2 and the external input device AP moves to the first reference direction RDR1 is described. For ease of explanation, in this third case C3, the seventh point P_1Fc will be described as being spaced apart from the non-sensing area NTA by the first distance ds_a, and the ninth point P_3Fc will be described as being spaced apart from the non-sensing area NTA by a distance greater than the first distance ds_a, and less than the second distance ds_b. The first edge center of gravity WC1_$a$ has the first level WC_a, the third center of gravity WC3 has a level less than the first level WC_a, and the second center of gravity WC2 has a level less than the first level WC_a, and greater than the level of the third center of gravity WC3. In this case, the first edge center of gravity WC1_a is greater than the second center of gravity WC2, and the third center of gravity WC3 is less than the second center of gravity WC2.

Accordingly, the correction value setting unit CTSP does not set the second center of gravity WC2 as the correction value CTV in this third case C3.

Referring to FIGS. 7A, 8, 9D, and 10, a fourth case C4 where the tenth point P_1Fd is disposed in the second sensing area TA2 and the external input device AP moves to the second reference direction RDR2 is described. For the convenience of explanation, in the fourth case C4, the tenth point P_1Fd will be described as being spaced apart from the non-sensing area NTA by a distance greater than the first distance ds_a, and less than the second distance ds_b, and the twelfth point P_3Fd will be described as being closer to the non-sensing area NTA than the tenth point P_1Fd is. The first edge center of gravity WC1_a has a level greater than the second level WC_b, the second center of gravity WC2 has a level greater than the level of the first edge center of gravity WC1_a, and the third center of gravity WC3 has a level greater than the level of the second center of gravity WC2. In this case, the first edge center of gravity WC1_a is less than the second center of gravity WC2, and the third center of gravity WC3 is greater than the second center of gravity WC2.

Accordingly, the correction value setting unit CTSP does not set the second center of gravity WC2 as the correction value CTV in this fourth case C4.

Referring to FIGS. 7A, 8, 9E, and 10, a fifth case C5 where the thirteenth point P_1Fe is disposed at the boundary between the first sensing area TA1 and the second sensing area TA2 and the external input device AP moves to the second reference direction RDR2 is described. For ease of explanation, in this fifth case C5, the thirteenth point P_1Fe will be described as being spaced apart from the non-sensing area NTA by the second distance ds_b, and the fifteenth point P_3Fe will be described as being spaced apart from the non-sensing area NTA by the first distance ds_a. The first edge center of gravity WC1_a has the second level WC_b, the third center of gravity WC3 has the first level WC_a, and the second center of gravity WC2 has a level between the first level WC_a and the second level WC_b. In this case, the first edge center of gravity WC1_a is less than the second center of gravity WC2, and the third center of gravity WC3 is greater than the second center of gravity WC2.

Accordingly, the correction value setting unit CTSP does not set the second center of gravity WC2 as the correction value CTV in this fifth case C5.

As an example, the sensing controller ICP may include a correction value memory unit CMMP. When the second center of gravity WC2 is set as the correction value CTV, the correction value setting unit CTSP stores the set correction value CTV in the correction value memory unit CMMP.

In addition, when it is determined that the movement direction of the external input device AP is the first reference direction RDR1, the direction determination unit DTP provides the first edge signal ES_a to the first comparison unit CPP1. The first comparison unit CPP1 reads out the correction value CTV from the correction value memory unit CMMP. The first comparison unit CPP1 compares the first edge signal ES_a with the correction value CTV.

When the first edge signal ES_a is equal to or less than the correction value CTV, the first comparison unit CPP1 provides the first edge signal ES_a to the calculation unit CP. In this case, the calculation unit CP calculates the edge input information I_ESS that corresponds to the input information of the external input device AP, which is applied to the second sensing area TA2, based on the first edge signal ES_a.

When the first edge signal ES_a is greater than the correction value CTV, the first comparison unit CPP1 provides the first edge signal ES_a to the correction unit CTP.

As an example, when it is determined that the movement direction of the external input device AP is the first reference direction RDR1, the first comparison unit CPP1 receives the first edge center of gravity WC1_a from the second extraction unit EXP2 included in the correction value setting unit CTSP. In this case, the first comparison unit CPP1 compares the first edge center of gravity WC1_a with the correction value CTV.

FIG. 7A shows an example in which the first comparison unit CPP1 receives the first edge center of gravity WC1_a from the second extraction unit EXP2.

When the first edge center of gravity WC1_a is equal to or less than the correction value CTV, the first comparison unit CPP1 provides the first edge center of gravity WC1_a to the calculation unit CP. In this case, the calculation unit CP calculates the edge input information I_ESS that corresponds to the input information of the external input device AP, which is applied to the second sensing area TA2, based on the first edge center of gravity WC1_a.

When the first edge center of gravity WC1_a is greater than the correction value CTV, the first comparison unit CPP1 provides the first edge center of gravity WC1_a to the correction unit CTP.

The correction unit CTP reads out the correction value CTV from the correction value memory unit CMMP. The correction unit CTP may correct the first edge signal ES_a based on the correction value CTV and generates a correction edge signal. As an example, when the correction unit CTP receives the first edge center of gravity WC1_a, the correction unit CTP may correct the first edge center of gravity WC1_a based on the correction value CTV and generates a first correction edge center of gravity WC1'_a. Hereinafter, an example in which the correction unit CTP receives the first edge center of gravity WC1_a and corrects the first edge center of gravity WC1_a to generate the first correction edge center of gravity WC1'_a will be described.

Referring to FIGS. 7A and 10, when the first level WC_a of the edge center of gravity corresponding to the second sensing area TA2 is greater than the correction value CTV, a difference between the edge center of gravity and the correction value CTV is referred to as a correction difference $\Delta WC$. The correction unit CTP may correct the edge center of gravity situated at the first level WC_a based on the correction difference $\Delta WC$ and may generate a correction edge center of gravity situated at the corrected level WC'_a, as shown in equation 1.

$$WC'\_a = WC\_a - 2 \times (\Delta WC) \qquad \text{Equation 1}$$

More particularly, in Equation 1, WC'_a denotes the level of the edge center of gravity after the correction operation, WC_a denotes the level of the edge center of gravity before the correction operation, and $\Delta WC$ denotes the correction difference, defined as a difference between the edge center of gravity and the correction value CTV.

Referring again to FIG. 7A, the correction unit CTP provides the first correction edge center of gravity WC1'_a generated through Equation 1 to the calculation unit CP. The calculation unit CP may calculate the edge input information I_ESS that corresponds to the input information of the external input device AP, which is applied to the second sensing area TA2, based on the first correction edge center of gravity WC1'_a.

As an example, when it is determined that the movement direction of the external input device AP is the second reference direction RDR2, the direction determination unit DTP provides an edge signal ES_b provided in the second reference direction RDR2 to the second comparison unit CPP2. Hereinafter, for ease of explanation, the edge signal ES_b provided in the second reference direction RDR2 is referred to as a second edge signal ES_b.

As an example, the second comparison unit CPP2 receives the second edge signal ES_b from the direction determination unit DTP and reads out the correction value CTV from the correction value memory unit CMMP. The second comparison unit CPP2 compares the second edge signal ES_b with the correction value CTV. When the second edge signal ES_b is equal to the correction value CTV, the second comparison unit CPP2 provides the second edge signal ES_b to the calculation unit CP. In this case, the calculation unit CP calculates the edge input information I_ESS that corresponds to the input information of the external input device AP, which is provided to the second sensing area TA2, based on the second edge signal ES_b.

When the second edge signal ES_b is different from the correction value CTV, the second comparison unit CPP2 provides the second edge signal ES_b to the correction value setting unit CTSP and the correction unit CTP.

As an example, the second comparison unit CPP2 includes a fourth extraction unit EXP4 and a sub-comparison unit SCCP. The fourth extraction unit EXP4 receives the second edge signal ES_b from the direction determination unit DTP and may extract a center of gravity (hereinafter, referred to as a second edge center of gravity WC1_b) of the second edge signal ES_b based on values for each position of the input sensing layer ISP included in the second edge signal ES_b. The sub-comparison unit SCCP receives the second edge center of gravity WC1_b from the fourth extraction unit EXP4 and compares the second edge center of gravity WC1_b with the correction value CTV.

When the second edge center of gravity WC1_b is equal to the correction value CTV, the sub-comparison unit SCCP provides the second edge center of gravity WC1_b to the calculation unit CP. In this case, the calculation unit CP may calculate the edge input information I_ESS that corresponds to the input information of the external input device AP, which is provided to the second sensing area TA2, based on the second edge center of gravity WC1_b.

When the second edge center of gravity WC1_b is different from the correction value CTV, the sub-comparison unit SCCP provides the second edge center of gravity WC1_b to the correction value setting unit CTSP and the correction unit CTP. FIG. 7A shows a configuration in which the second comparison unit CPP2 includes the fourth extraction unit EXP4 and the sub-comparison unit SCCP.

The sub-correction value setting unit SCSP included in the correction value setting unit CTSP receives the second edge center of gravity WC1_b from the second comparison unit CPP2 and receives the second center of gravity WC2 and the third center of gravity WC3 from the third extraction unit EXP3. The sub-correction value setting unit SCSP sets the correction value CTV based on the second edge center of gravity WC1_b, the second center of gravity WC2, and the third center of gravity WC3. In a case where the first sensing signal SS1 corresponds to the second sensing area TA2 and has the second reference direction RDR2 and the second edge center of gravity WC1_b is different from the correction value CTV, the first center of gravity may be the second edge center of gravity WC1_b.

As an example, when the second edge center of gravity WC1_b is greater than the second center of gravity WC2 and the third center of gravity WC3 is greater than the second center of gravity WC2, the sub-correction value setting unit SCSP sets the second center of gravity WC2 as the correction value CTV.

The correction unit CTP reads out the correction value CTV from the correction value memory unit CMMP. The correction unit CTP may correct the second edge signal ES_b based on the correction value CTV and generates the correction edge signal. As an example, when the correction unit CTP receives the second edge center of gravity WC1_b, the correction unit CTP may correct the second edge center of gravity WC1_b based on the correction value CTV and generates a second correction edge center of gravity WC1'_b. In this case, the correction unit CTP provides the second correction edge center of gravity WC1'_b generated through Equation 1 to the calculation unit CP. The calculation unit CP then calculates the edge input information I_ESS that corresponds to the input information of the external input device AP provided to the second sensing area TA2 based on the second correction edge center of gravity WC1'_b.

Referring to the first graph G1 shown in FIG. 10, when the second input TC is provided to the second sensing area TA2, the level of the center of gravity increases as the position where the second input TC is provided is closer to the non-sensing area NTA. This is because the transmission electrodes SE1_1 to SE1_5 (See FIG. 5) and the reception electrodes SE2_1 to SE2_4 (See FIG. 5) are not disposed in the non-sensing area NTA. Accordingly, the calculation unit CP incorrectly calculates the input information including coordinate information of the external input device AP.

Referring now to the second graph G2 shown in FIG. 10, according to the inventive concept, when the second input TC is provided to the second sensing area TA2, it is possible to determine whether an error, in which the level of the center of gravity increases as the position where the second input TC is provided is closer to the non-sensing area NTA, occurs. In addition, the correction value CTV may be calculated to correct the error, and the incorrectly calculated center of gravity is corrected based on the correction value CTV. Accordingly, although the sensing signal SS, which may be, for example, the center of gravity, by the external input device AP is distorted, the calculation unit CP may correctly calculate the input information including coordinate information of the external input device AP, and thus, the reliability of the input information is maintained.

Referring to FIG. 7B, when the first edge center of gravity WC1_a is equal to the correction value CTV, a second comparison unit CPP2_a, included in the sensing controller ICP further generates an initialization signal S_init. The second comparison unit CPP2_a provides the initialization signal S_init to a correction value memory unit CMMP_a. When receiving the initialization signal S_init, the correction value memory unit CMMP_a initializes the stored correction value CTV. Accordingly, when the input information of the external input device AP is calculated, the error caused by the incorrectly calculated correction value CTV is prevented from occurring.

Figure 11A:
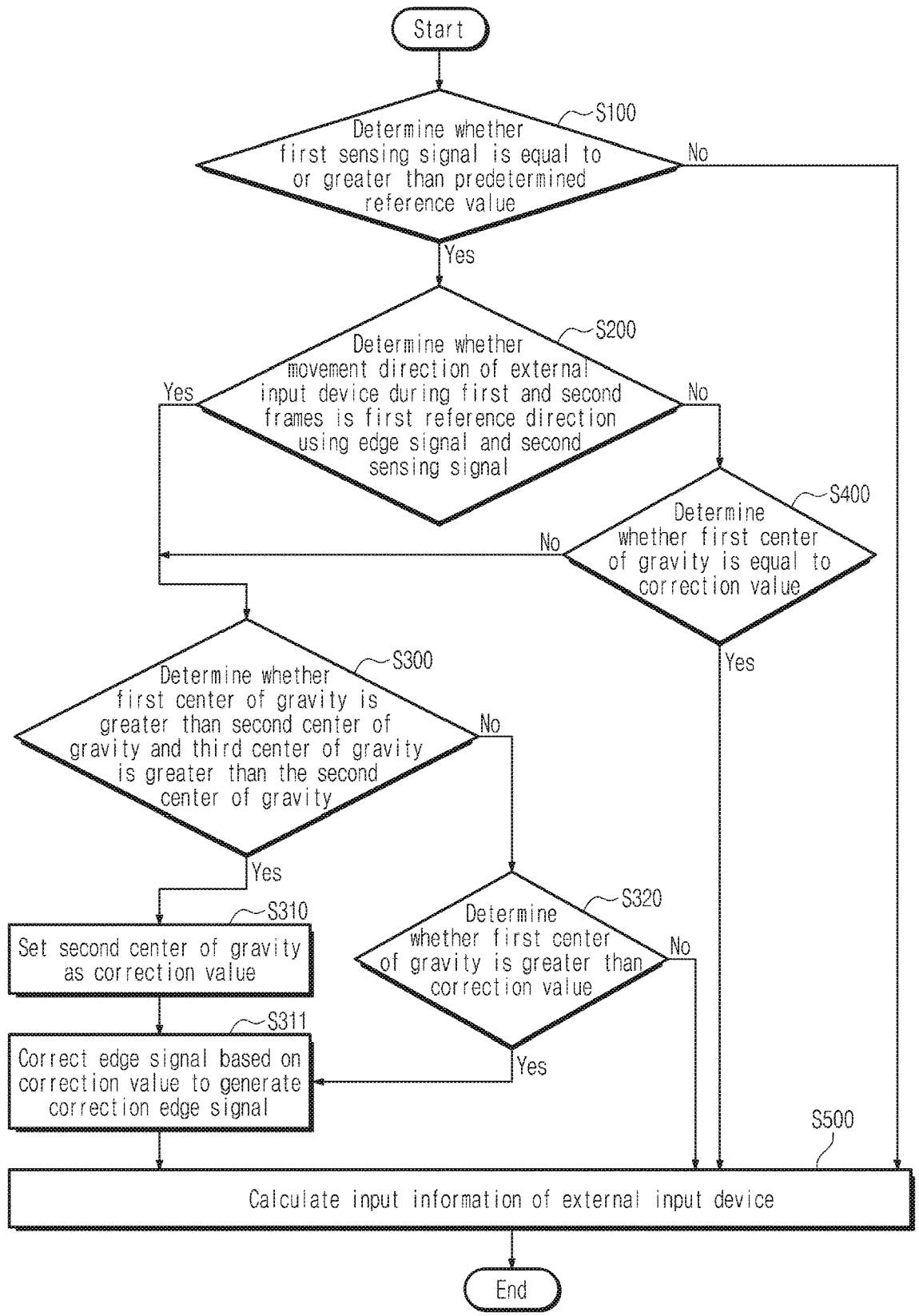
FIGS. 11A and 11B are flowcharts illustrating a method of driving a display device, according to an embodiment.
Figure 11B:
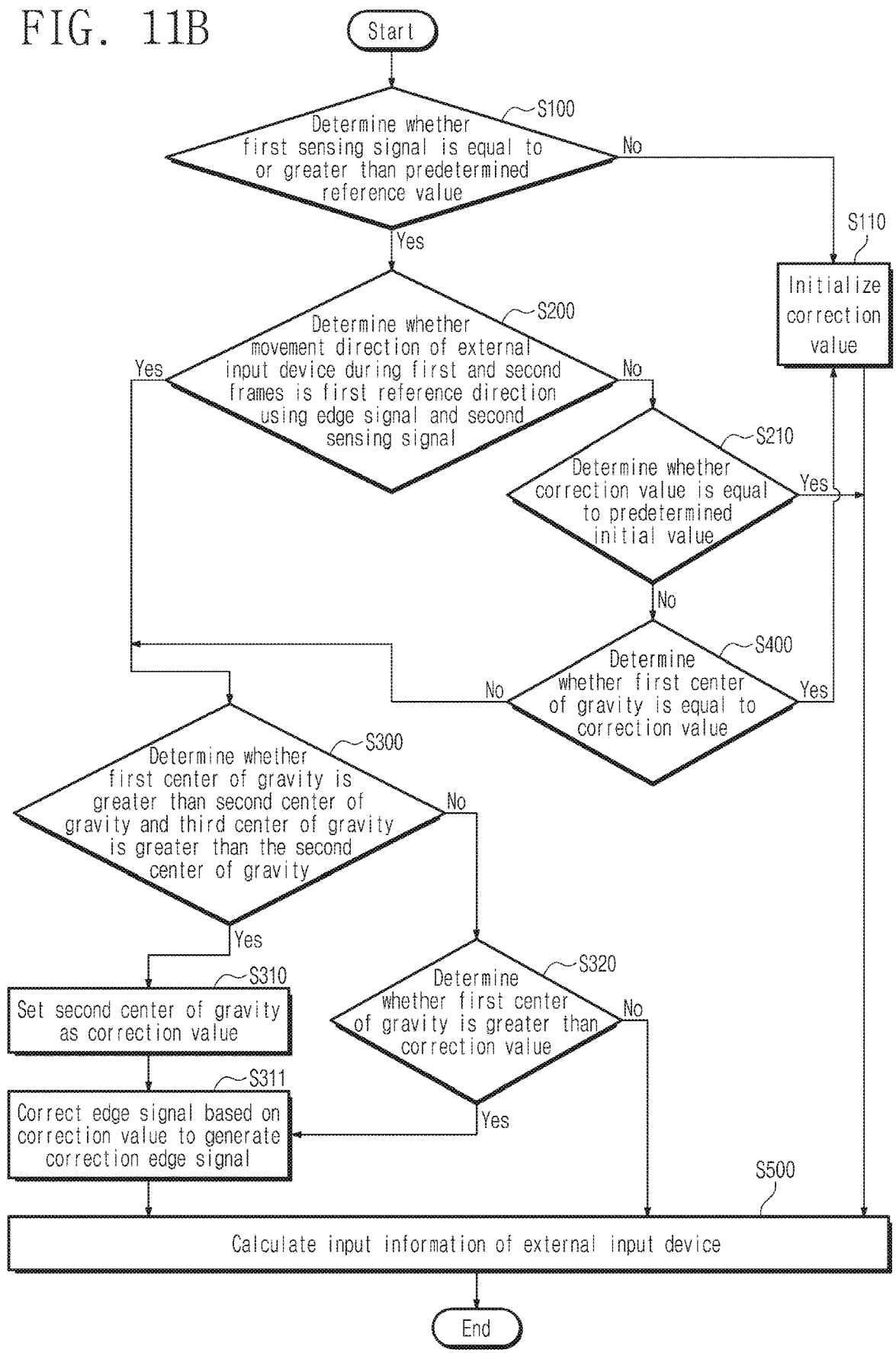

FIGS. 11A and 11B are flowcharts of a method of driving the display device according to an embodiment of the inventive concept. In FIGS. 11A and 11B, the same reference numerals denote the same elements and signals in FIG. 7A, and thus, detailed descriptions of the same elements and signals will be omitted.

Referring to FIGS. 6, 7A, 8, and 11A, the display device DD determines whether the first sensing signal SS1 generated by resonating with the electromagnetic signal EMS provided from the external input device AP in the first frame is equal to or greater than the predetermined reference value RFV via the sensing controller ICP (S100). Accordingly, it is possible to determine whether the first sensing signal SS1 is the center signal CS generated in the first sensing area TA1 or the edge signal ES generated in the second sensing area TA2. In particular, in the case where the first sensing signal SS1 is equal to or greater than the reference value RFV, the sensing controller ICP determines that the first sensing signal SS1 is the edge signal ES, and when the first sensing signal SS1 is less than the reference value RFV, the sensing controller ICP determines that the first sensing signal SS1 is the center signal CS.

Referring to FIGS. 7A, 9A to 9E, and 11A, when it is determined that the first sensing signal SS1 is the edge signal ES, the sensing controller ICP may determine whether the movement direction of the external input device AP during the first and second frames is the first reference direction RDR1, based on two parameters, the edge signal ES and the second sensing signal SS2 generated in the second frame right before the first frame (S200).

When it is determined that the movement direction of the external input device AP is the first reference direction RDR1, the sensing controller ICP sets the correction value CTV based on three parameters, a calculated first edge center of gravity of the edge signal ES, a calculated second center of gravity of the second sensing signal SS2, and a calculated third center of gravity of the third sensing signal SS3 generated in the third frame right before the second frame (S300). As an example, the sensing controller ICP sets the correction value CTV using the first edge center of gravity WC1_$a$ (hereinafter, referred to as the first center of gravity WC1_$a$ in FIGS. 11A and 11B) of the edge signal ES, which is calculated based on the edge signal ES, the second center of gravity WC2 of the second sensing signal SS2, which is calculated based on the second sensing signal SS2, and the third center of gravity WC3 of the third sensing signal SS3, which is calculated based on the third sensing signal SS3 (S300). In this case, the sensing controller ICP determines whether the first center of gravity WC1_$a$ is greater than the second center of gravity WC2 and whether the third center of gravity WC3 is greater than the second center of gravity WC2 (S300) to determine that the movement direction is the first reference direction RDR1.

Referring to FIGS. 7A, 10, and 11A, when the first center of gravity WC1_$a$ is determined to be greater than the second center of gravity WC2 and the third center of gravity WC3 is determined to be greater than the second center of gravity WC2, the sensing controller ICP sets the second center of gravity WC2 as the correction value CTV (S310). Thereafter, the sensing controller ICP corrects the edge signal ES based on the correction value CTV to generate the correction edge signal (S311). As an example, the sensing controller ICP corrects the first center of gravity WC1_$a$ based on the correction value CTV to generate the first correction edge center of gravity WC1'_$a$ (S311).

The sensing controller ICP calculates the input information I_SS of the external input device AP based on the correction edge signal (S500). As an example, the sensing controller ICP calculates the edge input information I_ESS provided to the second sensing area TA2 from among the input information I_SS provided by the sensing controller ICP based on the correction edge signal (S500). As an example, the sensing controller ICP also calculates the edge input information I_ESS based on the first correction edge center of gravity WC1'_$a$ (S500).

In one case where the first center of gravity WC1_$a$ is smaller than the second center of gravity WC2, or when the third center of gravity WC3 is less than the second center of gravity WC2 (S320), the sensing controller ICP determines whether the first center of gravity WC1_$a$ is greater than the correction value CTV. Alternatively, when it is otherwise determined that the first center of gravity WC1_$a$ is greater than the correction value CTV, the sensing controller ICP corrects the edge signal ES again based on the correction value CTV to generate the correction edge signal (S311). As an example, the sensing controller ICP corrects the first center of gravity WC1_$a$ based on the correction value CTV to generate the first correction edge center of gravity WC1'_$a$ (S311). When it is determined that the first center of gravity WC1_$a$ is equal to or less than the correction value CTV, the sensing controller ICP calculates the edge input information I_ESS provided to the second sensing area TA2 from among the input information I_SS provided by the sensing controller ICP based on the first center of gravity WC1_$a$ (S500).

As an example, when it is determined that the first sensing signal SS1 is the center signal CS in the case where the first sensing signal SS1 is determined to be equal to or greater than the predetermined reference value RFV (S100), the sensing controller ICP may calculate the center input information I_CSS provided to the first sensing area TA1 among the input information I_SS provided by the sensing controller ICP based solely on the center signal CS (S500).

As an example, when it is determined that the movement direction of the external input device AP is not in the first reference direction RDR1 (S200), the sensing controller ICP determines whether the edge signal ES is equal to the correction value CTV (S400). If it is determined that the edge signal ES is equal to the correction value CTV (S400), the movement direction of the external input device AP is determined to be in the second reference direction RDR2 opposite to the first reference direction RDR1. In addition, the sensing controller ICP determines whether the first center of gravity WC1_$a$ of the edge signal ES is equal to the correction value CTV (S400).

When it is determined that the first center of gravity WC1_$a$ is not equal to the correction value CTV, the sensing controller ICP may again determine whether the first center of gravity WC1_$a$ is greater than the second center of gravity WC2 and whether the third center of gravity WC3 is greater than the second center of gravity WC2 (S300) and may perform a subsequent operation according to the determined result. The subsequent operation includes the steps of setting the correction value CTV, generating the correction edge signal based on the correction value CTV, and calculating input information I_SS of an external input device AP based on the correction edge signal.

When it is determined that the first center of gravity WC1_$a$ is equal to the correction value CTV, the sensing controller ICP calculates the edge input information LESS provided to the second sensing area TA2 among the input information I_SS provided by the sensing controller ICP based solely on the first center of gravity WC1_$a$ (S500).

Referring to FIGS. 7B and 11B, a method of driving the display device DD is shown. Hereinafter, the same reference numerals denote the same operations in FIG. 11A, and thus, detailed descriptions of the same operations will be omitted.

As an example, when it is determined that the first sensing signal SS1 is equal to or greater than the reference value RFV as a result of the comparison between the first sensing signal SS1 and the predetermined reference value RFV (S100), the sensing controller ICP initializes the set correction value CTV (S110). As the correction value CTV is initialized when it is not necessary to compensate for the first sensing signal SS1, it is possible to prevent errors in calculating the input information of the external input device AP, which occurs due to the correction value CTV being set incorrectly. Then, the sensing controller ICP may calculate the center input information I_CSS provided to the first sensing area TA1 among the input information I_SS provided by the sensing controller ICP based on the center signal CS (S500).

As an example, when it is determined that the movement direction of the external input device AP is not the first reference direction RDR1 (S200), the sensing controller ICP determines whether the correction value CTV is equal to the predetermined initial value (S210). According to an embodiment, the predetermined initial value (S210) may be several to hundreds of times greater than the correction difference ΔWC (See FIG. 10).

When it is determined that the correction value CTV is equal to the predetermined initial value, the sensing controller ICP calculates the edge input information I_ESS, which is provided to the second sensing area TA2 among the totality of input information I_SS, based on both the first center of gravity WC1_a and the edge signal ES (S500).

When it is determined that the correction value CTV is not equal to the predetermined initial value (S210), the sensing controller ICP determines whether the first center of gravity WC1_a is equal to the correction value CTV (S400). When it is determined that the first center of gravity WC1_a is equal to the correction value CTV, the sensing controller ICP initializes the set correction value CTV (S110). Then, the sensing controller ICP calculates the edge input information I_ESS provided to the second sensing area TA2 among the input information I_SS provided by the sensing controller ICP based solely on the first center of gravity WC1_a (S500).

While the inventive concept has been particularly shown and described with reference to embodiments thereof, it will be understood that various changes in form and detail may be made therein without departing from the spirit and scope of the inventive concept as defined by the following claims.

What is claimed is:

1. A display device comprising:
a display panel configured to display an image;
an input sensing layer disposed on the display panel comprising a first sensing area, a non-sensing area, and a second sensing area disposed between the non-sensing area and the first sensing area, wherein the input sensing layer is configured to resonate with an electromagnetic signal provided from an external input device in a first frame to generate a first sensing signal; and
a sensing controller comprising:
an area determination unit configured to receive the first sensing signal from the input sensing layer and compare the first sensing signal with a predetermined reference value to determine whether the first sensing signal is a center signal corresponding to the first sensing area or an edge signal corresponding to the second sensing area, and
a calculation unit configured to calculate input information of the external input device based on the first sensing signal, and a correction unit configured to correct the edge signal generated in the second sensing area to generate a correction edge signal when the first sensing signal is determined to be the edge signal generated in the second sensing area,
wherein the calculation unit is further configured to calculate edge input information as input information about the edge signal provided to the second sensing area based on the correction edge signal.

2. The display device of claim 1, wherein the calculation unit is configured to calculate center input information provided to the first sensing area as input information of the external input device based on the center signal when the first sensing signal is determined to be the center signal.

3. The display device of claim 1, wherein the sensing controller further comprises a direction determination unit configured to determine a movement direction of the external input device, and
when the first sensing signal is determined to be the edge signal, the direction determination unit is configured to determine a movement direction of the external input device during a second frame right before the first frame and the first frame using the edge signal received from the area determination unit and a second sensing signal generated in the second frame.

4. The display device of claim 3, wherein the sensing controller further comprises a correction value setting unit configured to set a correction value, and receive the edge signal from the direction determination unit when it is determined that the movement direction of the external input device is a first reference direction toward the second sensing area away from the first sensing area.

5. The display device of claim 4, wherein the correction value setting unit is configured to set the correction value based on the edge signal, the second sensing signal, and a third sensing signal generated in a third frame right before the second frame.

6. The display device of claim 5, wherein, when a first center of gravity of the edge signal is greater than a second center of gravity of the second sensing signal and a third center of gravity of the third sensing signal is greater than the second center of gravity, the correction value setting unit is configured to set the second center of gravity as the correction value.

7. The display device of claim 6, wherein the correction unit is configured to correct the edge signal based on the correction value to generate the correction edge signal.

8. The display device of claim 7, wherein a difference between the correction value and the first center of gravity is a correction difference and the correction unit is configured to correct the edge signal based on the correction difference to generate the correction edge signal.

9. The display device of claim 7, wherein the sensing controller further comprises a first comparison unit configured to compare the edge signal with the correction value and generate the correction edge signal when it is determined that the edge signal is greater than the correction value.

10. The display device of claim 9, wherein the calculation unit is configured to calculate the edge input information based on the correction edge signal when the edge signal is greater than the correction value.

11. The display device of claim 9, wherein the calculation unit is configured to calculate the edge input information based on the edge signal when the edge signal is equal to or less than the correction value.

12. The display device of claim 6, wherein the sensing controller further comprises a correction value memory unit in which the correction value is stored.

13. The display device of claim 3, wherein the sensing controller further comprises:
a correction value setting unit configured to set a correction value; and
a second comparison unit configured to compare the edge signal with the correction value,
wherein the direction determination unit is configured to provide the edge signal to the second comparison unit where it is determined that a movement direction of the external input device is a second reference direction toward the first sensing area away from the second sensing area.

14. The display device of claim 13, wherein the calculation unit is configured to calculate the edge input information based on the edge signal when the edge signal is equal to the correction value.

15. The display device of claim 13, wherein the second comparison unit is configured to provide the edge signal to the correction value setting unit when the edge signal is different from the correction value.

16. The display device of claim 15, wherein the correction unit is configured to correct the edge signal based on the correction value to generate the correction edge signal, and the calculation unit is configured to calculate the edge input information based on the correction edge signal.

17. The display device of claim 1, wherein the sensing controller further comprises a memory unit in which a plurality of sensing signals are stored, wherein each of the plurality of sensing signals are generated by the electromagnetic signal provided from the external input device in every frame.

18. A method of driving a display device comprising a display panel displaying an image, an input sensing layer disposed on the display panel configured to resonate with an electromagnetic signal provided from an external input device in a first frame to generate a first sensing signal, and a sensing controller for calculating input information of the external input device based on the first sensing signal, the method comprising:
determining whether the first sensing signal is a center signal generated in a first sensing area of the input sensing layer or an edge signal generated in a second sensing area of the input sensing layer disposed between the first sensing area and a non-sensing area;
determining a movement direction of the external input device during the first frame and a second frame using the edge signal and a second sensing signal generated in the second frame right before the first frame;
setting a correction value based on the edge signal, the second sensing signal, a third sensing signal generated in a third frame right before the second frame when the determined movement direction of the external input device is determined to be a first reference direction toward the second sensing area away from the first sensing area; and
correcting the edge signal based on the correction value to generate a correction edge signal,
calculating edge input information as input information about the edge signal provided to the second sensing area based on the correction edge signal.

19. The method of claim 18, further comprising:
comparing the edge signal with the correction value when the movement direction of the external input device is determined to be a second reference direction toward the first sensing area away from the second sensing area; and
correcting the edge signal based on the correction value to generate the correction edge signal when the edge signal is different from the correction value.

* * * * *